(12) United States Patent
Berryhill et al.

(10) Patent No.: US 12,340,073 B2
(45) Date of Patent: Jun. 24, 2025

(54) DATA ACQUISITION WORKFLOWS FOR SCIENTIFIC INSTRUMENT SUPPORT SYSTEMS

(71) Applicant: Thermo Finnigan LLC, San Jose, CA (US)

(72) Inventors: Jenny S. Berryhill, Hillsboro, OR (US); Stephane Houel, Hillsboro, OR (US)

(73) Assignee: Thermo Finnigan LLC, San Jose, CA (US)

( * ) Notice: Subject to any disclaimer, the term of this patent is extended or adjusted under 35 U.S.C. 154(b) by 228 days.

(21) Appl. No.: 18/320,026

(22) Filed: May 18, 2023

(65) Prior Publication Data

US 2024/0094877 A1  Mar. 21, 2024

Related U.S. Application Data

(60) Provisional application No. 63/408,547, filed on Sep. 21, 2022.

(51) Int. Cl.
*G06F 3/0484* (2022.01)
*G06F 3/0482* (2013.01)

(52) U.S. Cl.
CPC .......... *G06F 3/0484* (2013.01); *G06F 3/0482* (2013.01)

(58) Field of Classification Search
CPC .............................. G06F 3/0484; G06F 3/0482
See application file for complete search history.

(56) References Cited

U.S. PATENT DOCUMENTS

| 2002/0007249 A1* | 1/2002 | Cranley | G01N 33/497 |
| | | | 702/24 |
| 2009/0124867 A1* | 5/2009 | Hirsh | A61M 5/1723 |
| | | | 128/203.14 |
| 2016/0023001 A1* | 1/2016 | Hess | A61B 5/02 |
| | | | 607/31 |
| 2019/0072566 A1 | 3/2019 | Yip et al. | |
| 2019/0164735 A1 | 5/2019 | Yip et al. | |
| 2022/0178890 A1* | 6/2022 | Shinholt | G01N 30/8665 |

OTHER PUBLICATIONS

International Search Report and Written Opinion for Application No. PCT/US23/74794 dated Jan. 12, 2024 (10 pages).

* cited by examiner

*Primary Examiner* — Tadesse Hailu
(74) *Attorney, Agent, or Firm* — Michael Best & Friedrich LLP

(57) ABSTRACT

Disclosed herein are scientific instrument support systems, as well as related methods, computing devices, and computer-readable media. For example, in some embodiments, a method is provided that includes receiving a first plurality of experiment parameters for a first experiment to be performed by a scientific instrument on a first sample, the first plurality of experiment parameters including a list, and storing the list. The method further includes receiving a second plurality of experiment parameters for a second experiment to be performed by the scientific instrument, the second plurality of experiment parameters including a selection, within a graphical user interface, of the list from the first experiment to reuse for the second experiment. The method further includes receiving experiment data relating to the second experiment and analyzing the experiment data based on the list from the first experiment to determine a result of the second experiment.

20 Claims, 28 Drawing Sheets

Exclusion List Parameters

Exclusion Override Factor (default = 3)
`3`

Exclusion List Peak Window Extension (s) (default = 0 s)
`0`

Exclusion Duration (s)
`10`

☑ Add Isotopes to Exclusion List

---

Combined Exclusion parameters m/z Tolerance (ppm) (default = 5ppm)
`5`

User-defined Minimum intensity  [Off]

User-defined Charge State  [Off]

FIG. 15B

Inclusion List Parameters

Inclusion List Peak Window Extension (s) (default = 0 s)
`0`

Inclusion List Peak Fragmentation Threshold (%) (default = 50%)
`50`

---

Combined inclusion parameters m/z Tolerance (ppm) (default = 5ppm)
`5`

User-defined Minimum intensity  [On]
Minimum Intensity
`1.00e+5`

User-defined Charge State  [On]
Charge State
`1-7`

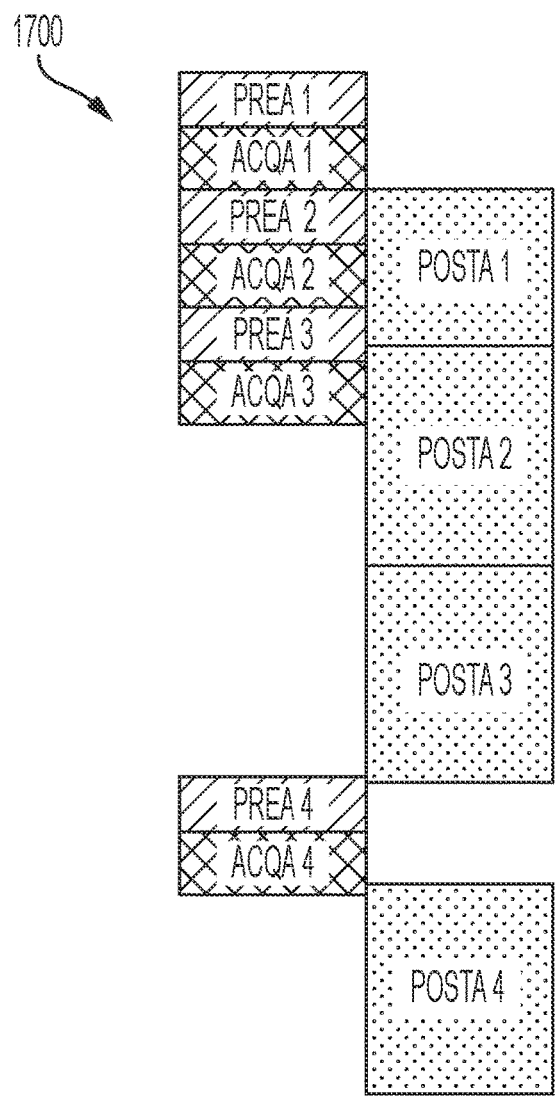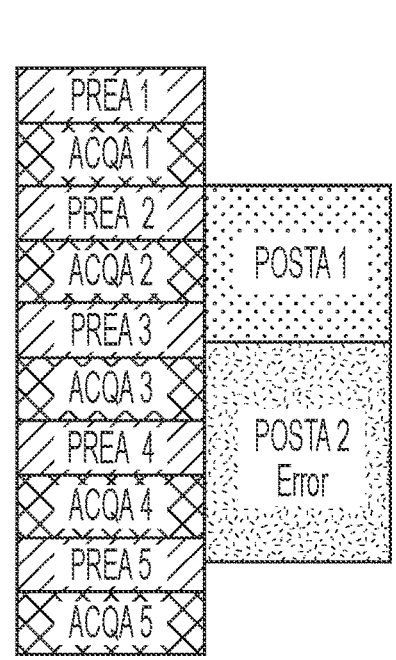
FIG. 17A
FIG. 17B

| Executing | Encounter | Post Processing dependency Condition | Decision |
|---|---|---|---|
| POSTA | PREA | Not depend on results of any preceding samples | Execute PREA |
| POSTA | PREA | Depend on results of one or more preceding samples | Wait for condition to be met |
| POSTA | ACQA | | Execute ACQA |
| POSTA | POSTA | Not depend on results of any preceding samples | Queue POSTA with no dependency condition (not overlap POSTA to POSTA) |
| POSTA | POSTA | Depend on results of one or more preceding samples | Queue POSTA with dependency condition (not overlap POSTA to POSTA) |
| Nothing | PREA | Not depend on results of any preceding samples | Execute PREA |
| Nothing | PREA | Depend on results of one or more preceding samples (possible cause is Acquisition or Error) | Wait for condition to be met |
| Nothing | ACQA | | Execute ACQA |
| Nothing | POSTA | Not depend on results of any preceding samples | Queue POSTA with no dependency condition |
| Nothing | POSTA | Depend on results of one or more preceding samples | Queue POSTA with dependency condition |
| PREA | No look ahead when executing PREA, basically shall complete PREA before moving forward | | |

|  | POSTA | PREA |
|---|---|---|
| Has ACQA not done in experiment | 20% | 20% |
| No more ACQA to be run in experiment (exclude dummy injection) | 60% | 0% |

FIG. 29

DATA ACQUISITION WORKFLOWS FOR SCIENTIFIC INSTRUMENT SUPPORT SYSTEMS

CROSS-REFERENCE TO RELATED APPLICATIONS

This application claims priority to U.S. Provisional Patent Application No. 63/408,547, filed Sep. 21, 2022, the entire contents of which is incorporated herein by reference.

SUMMARY

Scientific instruments are used in the chemical, life sciences, and other industries to, for example, determine substance composition, concentration, purity, and the like. These scientific instruments may include a mass spectrometer, a gas chromatography device, or other suitable devices. Samples of the substance are prepared by a technician for analysis by the scientific instruments. Data from the scientific instruments is provided to instrument support systems. The instrument support systems analyze the data and provide (for example, display) results of the analysis.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, not by way of limitation, in the figures of the accompanying drawings.

FIG. 10 illustrates a third graphical user interface displayed in the performance of some or all of the scientific instrument support operations disclosed herein, in accordance with various embodiments.

FIG. 12 illustrates a fifth graphical user interface displayed in the performance of some or all of the scientific instrument support operations disclosed herein, in accordance with various embodiments.

FIG. 15A illustrates an eighth graphical user interface displayed in the performance of some or all of the scientific instrument support operations disclosed herein, in accordance with various embodiments.

FIG. 15B illustrates a ninth graphical user interface displayed in the performance of some or all of the scientific instrument support operations disclosed herein, in accordance with various embodiments.

FIG. 17A is a block diagram of a method of data execution, in accordance with various embodiments.

FIG. 17B is a block diagram of a method of data execution including an error, in accordance with various embodiments.

FIG. 20 illustrates an eleventh graphical user interface displayed in the performance of some or all of the scientific instrument support operations disclosed herein, in accordance with various embodiments.

FIG. 21 illustrates a twelfth graphical user interface displayed in the performance of some or all of the scientific instrument support operations disclosed herein, in accordance with various embodiments.

FIG. 28 illustrates a parallel processing workflow sequence table, in accordance with various embodiments.

FIG. 29 illustrates a parallel processing power allocation table, in accordance with various embodiments.

DETAILED DESCRIPTION

Figure 1:
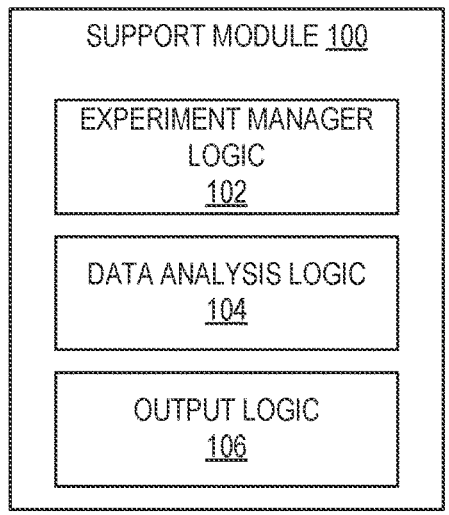
FIG. 1 is a block diagram of an example scientific instrument support module for performing support operations, in accordance with various embodiments.

Disclosed herein are scientific instrument support systems, as well as related methods, computing devices, and computer-readable media. For example, in some embodiments, a method is provided that includes receiving a first plurality of experiment parameters for a first experiment to be performed by a scientific instrument on a first group of a substance, the first plurality of experiment parameters including a list that includes at least one selected from a group consisting of an inclusion list and an exclusion list, and storing the list. The method further includes receiving, with an electronic processor, a second plurality of experiment parameters for a second experiment to be performed by the scientific instrument, the second plurality of experiment parameters including a selection, within a graphical user interface, of the list from the first experiment to reuse for the second experiment. The method further includes receiving, with an electronic processor, experiment data relating to the second experiment and analyzing, with an electronic processor, the experiment data based on the list from the first experiment to determine a result of the second experiment.

The scientific instrument support embodiments disclosed herein may achieve improved performance relative to conventional approaches. For example, when performing mass spectrometry analysis (including, for example, mass spectrometry (MS), tandem mass spectrometry MSn, and the like), experiment parameters are defined by a technician prior to performing the experiment, which may take a significant amount of time to define and may extend the overall time needed to complete the experiment. Also, errors in setting the experiment parameters may significantly waste resources as the experiment may need to be redone, which wastes computing resources, instrument usage, and substance samples. The experiment parameters may include, for example, an inclusion list, an exclusion list, or both, and creating such lists for each experiment takes time and computing resources. Embodiments described herein allow inclusion lists, exclusion lists, or both to be reused from one experiment group to another group and, in some embodiments, allow a combined list to be created that combines lists from two to three or more groups. To reuse a list, embodiments described herein provide user interfaces that allow a user to select a list for reuse as well as additional list parameters that may modify the reused list for a particular group. Accordingly, embodiments described herein significantly reduce the time taken to complete an experiment by the scientific instrument.

The embodiments disclosed herein may reduce the time and effort conventionally taken when performing scientific experiments using scientific instruments relative to conventional approaches. These conventional approaches suffer from a number of technical problems and limitations, including user fatigue and the possibility of user error as a user is tasked with repeating parameters to arrive at an experimental output since conventional approaches do not offer reuse of parameters for subsequent experiments. If an experiment requires multiple iterations of analysis on the same data, conventional approaches may task a user with re-inputting parameters for each iteration, thus complicating any multi-staged experiments. In addition, various ones of the embodiments disclosed herein may provide improvements to graphical user interface (GUI) technology. Conventional GUIs lack customization features for customizing parameters input for each data sample. Additionally, conventional GUIs lack the ability to group data and assign a label to the grouped data. Such conventional GUIs suffer from a number of technical problems and limitations, including lacking the interface elements to input groups of data that may be processed in parallel.

Various ones of the embodiments disclosed herein may improve upon conventional approaches to achieve the technical advantages of streamlined repetition of experiments and higher throughput by applying defined parameters to multiple experiments and processing the parameters in parallel with one another. Additionally, the embodiments disclosed herein mitigate human error when selecting parameters for multiple iterations of scientific experiments performed on samples by automatically providing a selection such that the same parameters may be used during the processing of samples.

Such technical advantages are not achievable by routine and conventional approaches, and all users of systems including such embodiments may benefit from these advantages (e.g., by assisting the user in the performance of a technical task, such as defining parameters for a scientific experiment, by means of a guided human-machine interaction process). The technical features of the embodiments disclosed herein are thus decidedly unconventional in the field of support systems for scientific instruments, as are the combinations of the features of the embodiments disclosed herein. As discussed further herein, various aspects of the embodiments disclosed herein may improve the functionality of a computer itself; for example, by freeing up resources during parallel processing. The computational and user interface features disclosed herein do not only involve the collection and comparison of information but apply new analytical and technical techniques to change the operation of data processing workflow. The present disclosure thus introduces functionality that neither a conventional computing device, nor a human, could perform.

Accordingly, the embodiments of the present disclosure may serve any of a number of technical purposes, such as controlling a specific technical system or process. In particular, the present disclosure provides technical solutions to technical problems including, but not limited to, reusing experiment parameters for subsequent experiments, which improves the speed and operation of scientific instruments.

The embodiments disclosed herein thus provide improvements to scientific instrument support technology (e.g., improvements in the computer technology supporting scientific instruments, among other improvements).

In the following detailed description, reference is made to the accompanying drawings that form a part hereof wherein like numerals designate like parts throughout, and in which is shown, by way of illustration, embodiments that may be practiced. It is to be understood that other embodiments may be utilized, and structural or logical changes may be made, without departing from the scope of the present disclosure. Therefore, the following detailed description is not to be taken in a limiting sense.

Various operations may be described as multiple discrete actions or operations in turn, in a manner that is most helpful in understanding the subject matter disclosed herein. However, the order of description should not be construed as to imply that these operations are necessarily order dependent. In particular, these operations may not be performed in the order of presentation. Operations described may be performed in a different order from the described embodiment. Various additional operations may be performed, and/or described operations may be omitted in additional embodiments.

For the purposes of the present disclosure, the phrases "A and/or B" and "A or B" mean (A), (B), or (A and B). For the purposes of the present disclosure, the phrases "A, B, and/or C" and "A, B, or C" mean (A), (B), (C), (A and B), (A and C), (B and C), or (A, B, and C). Although some elements may be referred to in the singular (e.g., "a processing device"), any appropriate elements may be represented by multiple instances of that element, and vice versa. For example, a set of operations described as performed by a processing device may be implemented with different ones of the operations performed by different processing devices.

The description uses the phrases "an embodiment," "various embodiments," and "some embodiments," each of which may refer to one or more of the same or different embodiments. Furthermore, the terms "comprising," "including," "having," and the like, as used with respect to embodiments of the present disclosure, are synonymous. When used to describe a range of dimensions, the phrase "between X and Y" represents a range that includes X and Y. As used herein, an "apparatus" may refer to any individual device, collection of devices, part of a device, or collections of parts of devices. The drawings are not necessarily to scale.

FIG. 1 is a block diagram of a scientific instrument support module 100 for performing support operations, in accordance with various embodiments. The scientific instrument support module 100 may be implemented by circuitry (e.g., including electrical and/or optical components), such as a programmed computing device. The logic of the scientific instrument support module 100 may be included in a single computing device or may be distributed across multiple computing devices that are in communication with each other as appropriate. Examples of computing devices that may, singly or in combination, implement the scientific instrument support module 100 are discussed herein with reference to the computing device 400 of FIG. 4, and examples of systems of interconnected computing devices, in which the scientific instrument support module 100 may be implemented across one or more of the computing devices, is discussed herein with reference to the scientific instrument support system 500 of FIG. 5.

The scientific instrument support module 100 may include workflow or experiment manager logic 102, data analysis logic 104, and output logic 106. As used herein, the term "logic" may include an apparatus that is to perform a set of operations associated with the logic. For example, any of the logic elements included in the support module 100 may be implemented by one or more computing devices programmed with instructions to cause one or more processing devices of the computing devices to perform the associated set of operations. In a particular embodiment, a logic element may include one or more non-transitory computer-readable media having instructions thereon that, when executed by one or more processing devices of one or more computing devices, cause the one or more computing devices to perform the associated set of operations. As used herein, the term "module" may refer to a collection of one or more logic elements that, together, perform a function associated with the module. Different ones of the logic elements in a module may take the same form or may take different forms. For example, some logic in a module may be implemented by a programmed general-purpose processing device, while other logic in a module may be implemented by an application-specific integrated circuit (ASIC). In another example, different ones of the logic elements in a module may be associated with different sets of instructions executed by one or more processing devices. A module may not include all of the logic elements depicted in the associated drawing; for example, a module may include a subset of the logic elements depicted in the associated drawing when that module is to perform a subset of the operations discussed herein with reference to that module.

Figure 3:
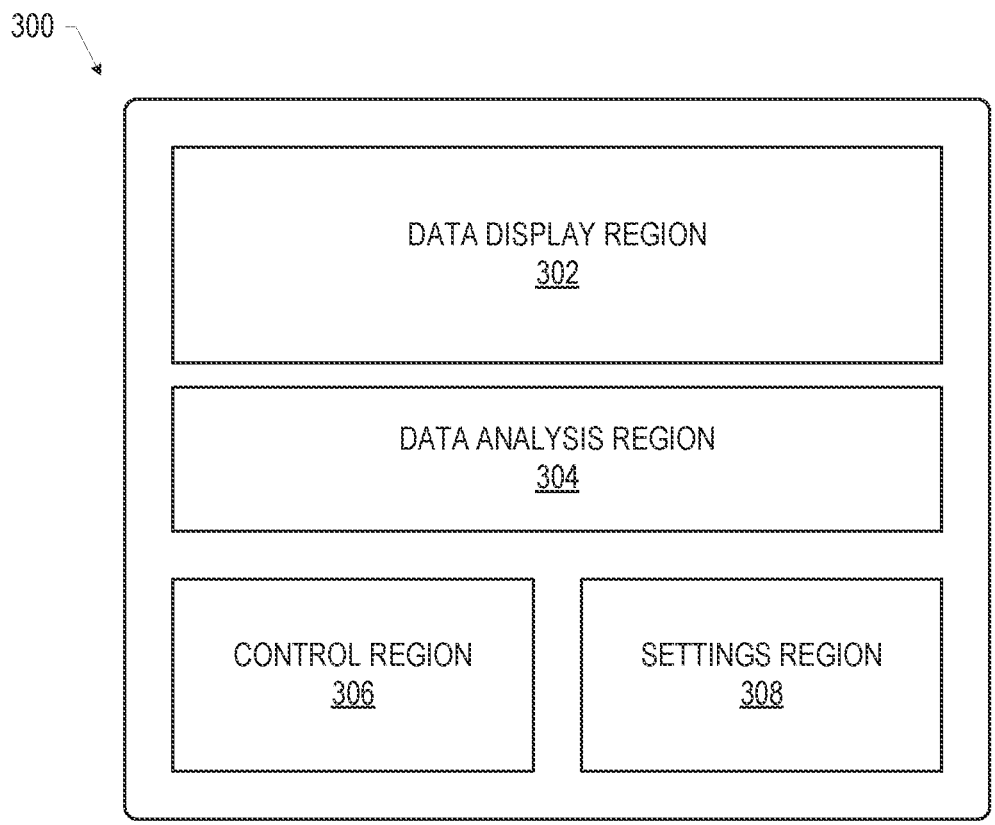
FIG. 3 is an example of a graphical user interface that may be used in the performance of some or all of the scientific instrument support operations disclosed herein, in accordance with various embodiments.

The experiment manager logic 102 may manage a type of experiment being performed on a sample. The type of experiment may be defined based on input received from an end-user, and may be, for example, a small molecule experiment or a large molecule experiment (for example, a biopharmaceutical experiment, a protein experiment, an oligo experiment, and the like). A particular experiment type may be associated with particular processes or jobs. For example, a small molecule type experiment may be associated with a small molecule experiment job (for example, a first system process), and a large molecule type experiment may be associated with a large molecule experiment job (for example, a second system process). The experiment type, associated processes, or both may be selectable via a graphical user interface (GUI), such as GUI 300 (FIG. 3). For example, in some embodiments, corresponding workflows are displayed on a GUI 300 based on a system process selected by a user (e.g., at GUI 800 (FIG. 8)). In addition to workflows, previously conducted and saved experiments may be presented on the GUI 300 by the experiment manager logic 102. The experiment manager logic 102 may manage data and processes performed via a scientific instrument, such as scientific instrument 510 (FIG. 5), and a computing device, such as at least one of user local computing device 520, service local computing device 530, and remote computing device 540 (FIG. 5) based on a workflow and/or experiment type selected (e.g., via one or more GUIs 300). The data and processes may include at least one experiment file, which may be a ".xsld" file, at least one instrument method file, which may be a ".Meth" file, or a combination thereof. An instrument method file may include, for example, a full scan template, a tandem mass spectrometry (MSn) template, and the like. In some embodiments, the experiment manager logic 102 may require at least two method files when executing an experiment performed on a sample (e.g., a first group of a small molecule substance, a first group of a large molecule substance, a second group of the small molecule substance, a second group of the large molecule substance, etc.). For example, in a large molecule experiment job, at least one method file for a blank/exclusion/inclusion sample type (for example, a first full scan (MS1) template or a tandem mass spectrometry (MS2) template) may be used to execute an experiment on a sample. Additionally, at least one method file for blank/exclusion/inclusion sample type and a second method file may be used for an injection type (for example, an ID sample type) to execute an experiment on a sample. A template for an experiment may also automatically set or modify parameters for the experiment. For example, in the case that the MS2 template is selected for an inclusion list, fragmented ions may be automatically removed from the inclusion list and added to the exclusion list. In some embodiments, as described in further detail below, selected templates for ID samples may be combined with the inclusion list, the exclusion list, or both output by the data analysis logic. It should be understood that the use of "list" throughout the present document includes an inclusion list, the exclusion list, or both.

The data analysis logic 104 may include multiple workflows for analyzing data in an experiment as communicated by the experiment manager logic 102. As described above, the workflows displayed on the GUI 300 may correspond to a selected system process. For example, the first system process may correspond to small molecule experiment job and the second system process may correspond to large molecule experiment job. Workflows corresponding to the first system process include, for example, a background exclusion workflow, a background exclusion and component inclusion workflow, an iterative precursor exclusion workflow, a deep scan workflow, and a custom workflow. The workflows corresponding to the first system process will be described below with respect to FIG. 9. The second system process may include a custom large molecule workflow. The custom large molecule workflow will be described below with respect to FIG. 11. In some embodiments, the first system process and the second system process may include the same workflows. Regardless of whether the first system process and the second system process include the same workflows, the first system process and the second system process may include different feature detections and different modes for instrument methods.

The data analysis logic 104 analyzes an output of the scientific instrument based on the experiment parameters (set based on input received from a user) and the selected workflow to provide a result of the experiment. The data output from the scientific instrument may include an ID sample type (also referred to as an injection type). The experimental parameters are provided by the data analysis logic 104 based on the ID sample. For example, the experimental parameters associated with the method files for the ID sample are updated based on an ID sample (e.g., a first sample) prior to analysis of the ID sample (e.g., a second sample) to optimize meaningful fragmentation scans during the analysis. The experimental parameters include parameters that are defined within a selected workflow. The parameters may include inputs defined by a user via text boxes, drop-down menus, and the like displayed on a GUI 300. User-provided inputs are stored by the data analysis logic 104 corresponding to a selected workflow. The parameters may include an inclusion list, an exclusion list, or both (for example, a list that is a compilation of one or more compounds (e.g., molecules), mass/charge (m/z) ratios or values, charge states, and retention times that serves as parameters for the data) that is user-defined on the GUI 300. The results of an experiment, the experiment parameters including the inclusion/exclusion list(s), and corresponding experiment files may be stored as a group and labeled with a group identifier (for example, group 1, group 2, and the like). In some embodiments, the group may contain one or more ID samples. In some embodiments, the data analysis logic 104 may process group data for various experiments in parallel. Parallel processing may be implemented when the groups do not depend on one another.

The output logic 106 may output data to a storage device of a computing device, such as storage device 404 of computing device 400 (FIG. 4), as well as provide the output data to the GUI 300. The type of data output in the output data may be dependent on the selected system process such that the experiment manager logic 102, the data analysis logic 104, or both provides an indication to the output logic 106 as to what data to include in the output. For example, when the data analysis logic 104 processes data under a workflow according to a first system process, the output data may include at least one of a legacy component detection algorithm for small molecules (LPE), a new component detection algorithm from small molecules (NCD), a LPE/NCD exclusion mass list for Group 1 (for example, {LPE}/{NCD}ExclusionOutputG01.xml), a LPE/NCD inclusion mass list for Group 1 (for example, {LPE}/{NCD} InclusionOutputG01.xml), an accumulative exclusion/inclusion mass list for a current group (for example, ILPEV{NCD}AccumulativeOutputG01.xml), a combined list of exclusion/inclusion masses to update a method file for a first ID sample (e.g., a first sample) of a current group (for example, CombinedList1.xml), exclusion list parameters and inclusion list parameters settings for exclusion and inclusion lists to be used for the ID method (for example, ID.log), and instrument method files for subsequent ID number of the experiment conducted (for example, *ID_0*.Meth). The output may be presented on the GUI as a listing of files. When the custom large molecule workflow is performed by the data analysis logic 104 (i.e., the second system process is selected), the output data provided by the output logic 106 may include at least one of: parameters in JavaScript Object Notation (JSON) format for Mass Analyzer Component Detection (for example, mOptions.json), parameters for Mass Analyzer of the exclusion reference or the inclusion reference (for example, Exclusion or Inclusion Reference log), Mass Analyzer algorithm result file for Exclusion Reference Raw File or Inclusion Reference Raw File (for example, {ExclRawFile}.CSV or {InclRawFile}.CSV), Mass Analyzer exclusion mass list for Group 1 (for example, MAExclusionOutoutG01.xml), Mass Analyzer inclusion mass list for Group 1 (for example, MAInclusionOutoutG01.xml), accumulative exclusion/inclusion mass lists for current group (for example, MAAccumulativeOutput.xml), combined list of exclusion/inclusion masses to update the method template (for example, CombinedList1.xml), exclusion list parameters and inclusion list parameters settings for exclusion and inclusion lists to be used for the ID method (for example, ID.log), and instrument method files for subsequent ID number of the experiment conducted (for example, *ID_0*.Meth). Alternative output data provided by the output logic 106 is also contemplated.

Figure 2:
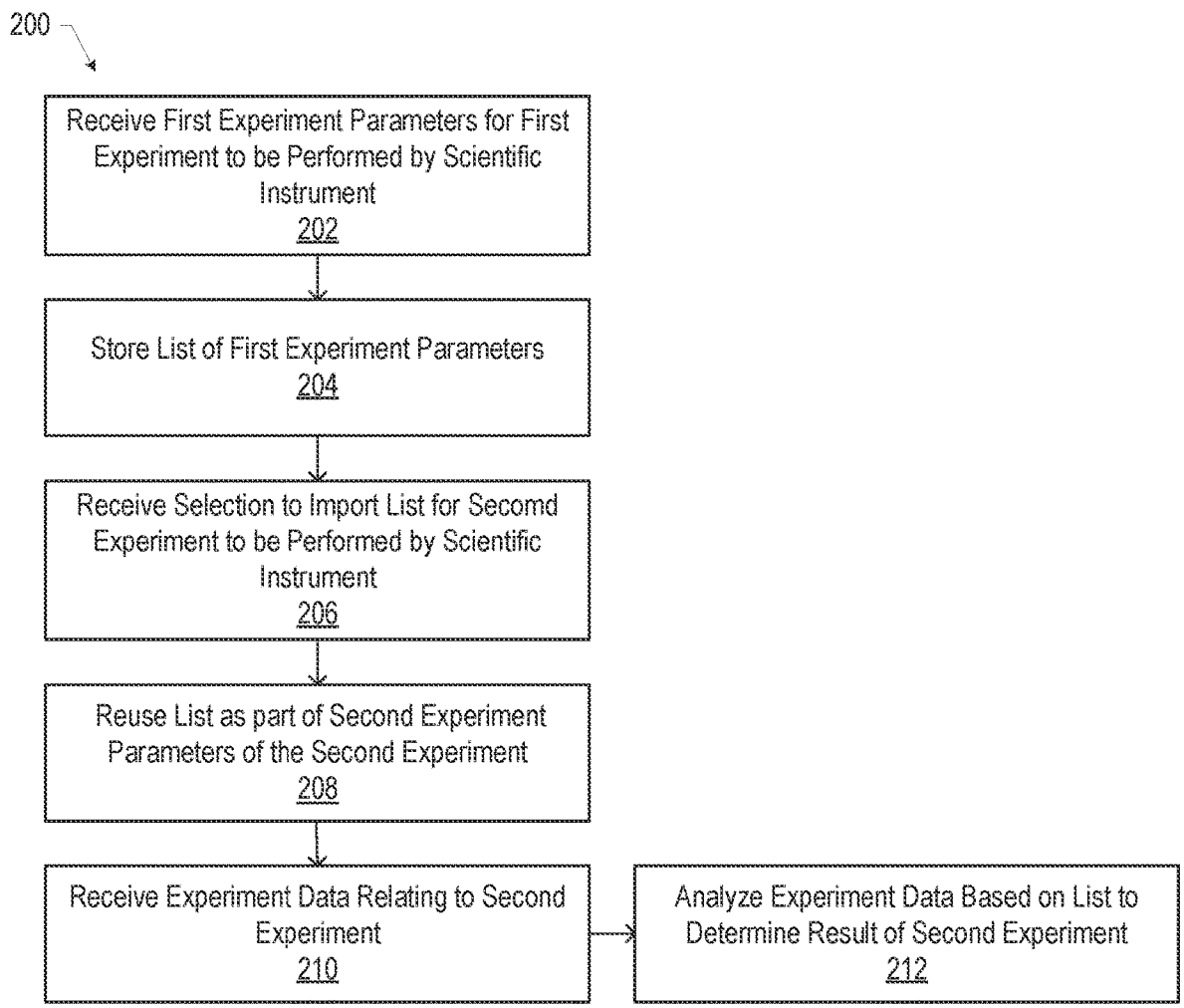
FIG. 2 is a flow diagram of an example method of performing scientific instrument support operations, in accordance with various embodiments.

FIG. 2 is a flow diagram of a method 200 of performing scientific instrument support operations, in accordance with various embodiments. Although the operations of the method 200 may be illustrated with reference to particular embodiments disclosed herein (e.g., the scientific instrument support module 100 discussed herein with reference to FIG. 1, the GUI 300 discussed herein with reference to FIG. 3, the computing devices 400 discussed herein with reference to FIG. 4, and/or the scientific instrument support system 500 discussed herein with reference to FIG. 5), the method 200 may be used in any suitable setting to perform any suitable support operations. Operations are illustrated once each and in a particular order in FIG. 2, but the operations may be reordered and/or repeated as desired and appropriate (e.g., different operations performed may be performed in parallel, as suitable).

At 202, the method 200 includes receiving first experiment parameters for a first experiment to be performed by a scientific instrument on a first sample. The data analysis logic 104 of the support module 100 may perform the operations of 202. The data analysis logic 104 receives user input (via one or more GUIs) defining the first experiment parameters including, for example, the instrument methods to be used (for example, full scan, tandem mass spectrometry, and the like), component detection settings, exclusion list parameters, inclusion list parameters, and the like. Further details of selecting an instrument method for use are described below with respect to FIGS. 9, 11, and 19. For example, in some embodiments, the first experiment parameters include at least one list, such as, for example, an inclusion list, an exclusion list, or a combination thereof. Further details of selecting component detection settings, exclusion list parameters, and inclusion list parameters are described below with respect to FIGS. 10, 12, 14, 15A, 15B, 20 and 21. The first experiment is performed on the first sample based on the first experiment parameters. Performing the first experiment may include the data analysis logic 104 receiving, from the scientific instrument, experiment data (for example, raw data of a sample collected by the scientific instrument) relating to the first experiment and analyzing the experiment data based on the experiment parameters (for example, the inclusion or exclusion lists) to determine a first result (for example, a processed data output based on the experiment parameters) of the first experiment. In the case of a mass spectrometry, the experiment data may include, for example, a mass-to-charge ratio of a molecule and the result of the first experiment may include, for example, a distribution of molecular weights within a substance. In some embodiments, prior to receiving first experiment parameters (at 202), the experiment manager logic 102 may receive user input (via the one or more GUIs 300) selecting the type of experiment being performed (for example, small molecule, large molecule, or a previously saved experiment). Further details of selecting the type of experiment being performed are described below with respect to FIG. 8.

At 204, the method 200 includes storing the list of the first experiment parameters. The data analysis logic 104 may perform the operations of 204. The data analysis logic 104 may store the at least one list and other first experiment parameters as a first experiment group corresponding to the first experiment for the sample in a memory, such as, for example, a memory of a computing device (for example, computing device 400, user local computing device 520) or a memory of the scientific instrument (for example, scientific instrument 510). The first experiment group may be assigned a group identifier (for example, group 1, group 2, and the like) for later recall by the data analysis logic 104. In some embodiments, the output logic 106 stores the list of the first experiment parameters.

At 206, the method 200 includes receiving a selection to reuse the at least one list associated with the first experiment for a second experiment to be performed by the scientific instrument on a second sample. The data analysis logic 104 may perform the operations of 206. In some embodiments, the second sample is the same as the first sample. Alternatively, in some embodiments, the second sample is different from the first sample. For example, the first sample may be a first component of a substance and the second sample may be a second component of a substance. The data analysis logic 104 may receive user input (for example, via one or more GUIs) defining the second experiment parameters. However, rather than redefining the inclusion list, the exclusion list, or both lists, the user may opt to reuse a previously created inclusion list, a previously created exclusion list, or a combination thereof from a prior experiment (for example, the first experiment). The user may select to reuse the list of the first experiment by, for example, selecting the group identifier (for example "group 1", "group 2", and the like) associated with the first experiment parameters from a drop-down menu or other type of selection mechanism in a GUI. In some embodiments, the user may select to reuse experiment parameters from multiple experiment groups (e.g., up to a predetermined number of groups). For example, in some embodiments, a GUI presented via the support module 100 allow a user to select up to a total of three previous groups when selecting to reuse experiment parameters. For example, in an experiment with eight groups, group six may reuse experiment parameters from up to three groups selected from groups one to five. In some embodiments, when multiple groups are selected, the experiment parameters of each selected experiment group are combined by the data analysis logic 104. Further details of reusing the at least one list for the second experiment are described below with respect to FIGS. 10 and 12.

At 208, the method 200 includes reusing experiment parameters from the selected one or more groups, such as, for example, reusing at least one list, as part of second experiment parameters of the second experiment. The data analysis logic 104 may perform the operations of 208. In response to receiving the user input selecting to reuse experimenter parameters from the first experiment (for example, based on a selection of a previous group), the data analysis logic 104 accesses selected parameters, such as an inclusion list, an exclusion list, or both used with the first experiment, from the memory and includes the accessed parameters (for example, list(s)) as part of the second experiment parameters. Further details of reusing the experiment parameters from the selected one or more groups for the second experiment are described below with respect to FIGS. 10 and 12.

At 210, the method 200 includes receiving, from the scientific instrument, experiment data relating to the second experiment. In some embodiments, the experiment data (e.g., the second sample) may be the same raw data collected by the scientific experiment used during the first experiment (e.g., the first sample). Alternatively, in some embodiments, the experiment data may be second experiment data that is raw data collected by the scientific experiment. The data analysis logic 104 may perform the operations at 210. The scientific instrument performs the experiment and provides the resulting data to the data analysis logic 104. At 212, the method 200 includes analyzing the experiment data (e.g., the second sample) based on the list (as reused from the first experiment) to determine a second result (for example, a processed data output based on the second experiment parameters) of the second experiment. The data analysis logic 104 may perform the operations of 212. For example, in some embodiments, the data analysis logic 104 analyzes the experiment data based on the second experiment parameters including the inclusion list, exclusion list, or both reused from the first experiment parameters. In one example of a mass spectrometry experiment, the inclusion list, the exclusion list, or both may include one or more signal or data thresholds, and analyzing the experiment data may include applying the one or more signal or data threshold to the experiment data associated with the second experiment. In some embodiments, the output logic 106 outputs the second result to a memory, such as, for example, a memory of a computing device (for example, computing device 400, user local computing device 520) or a memory of the scientific instrument (for example, scientific instrument 510). Further details of outputting the second results are described below with respect to FIG. 13.

Figure 4:
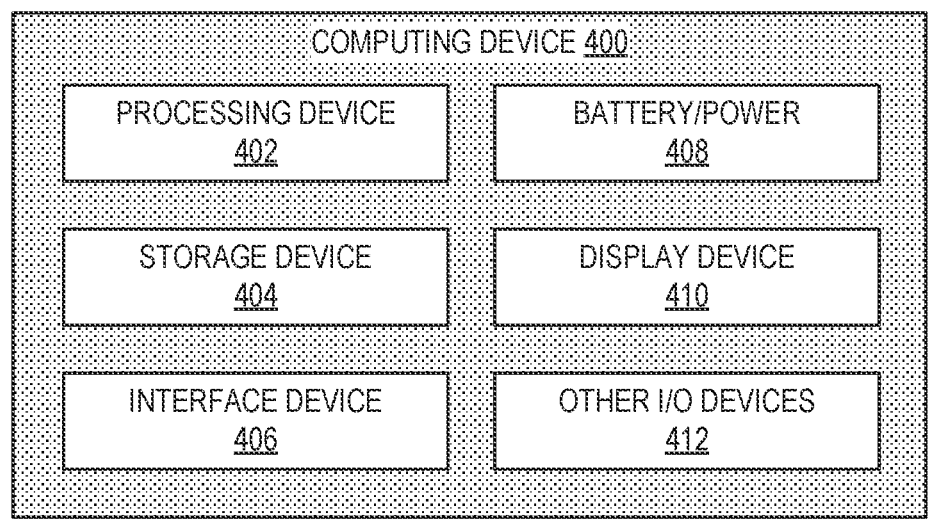
FIG. 4 is a block diagram of an example computing device that may perform some or all of the scientific instrument support operations disclosed herein, in accordance with various embodiments.
Figure 5:
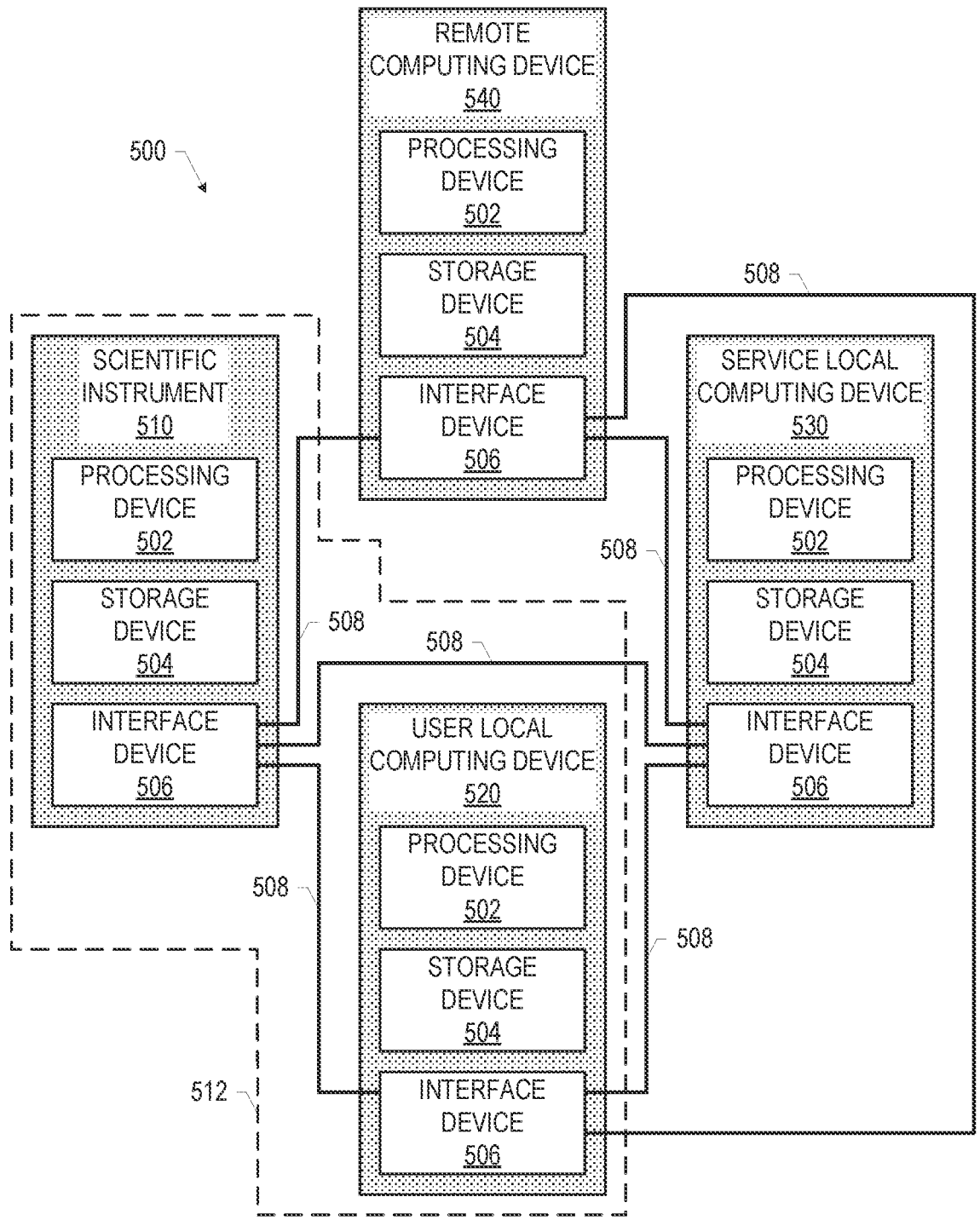
FIG. 5 is a block diagram of an example scientific instrument support system in which some or all of the scientific instrument support operations disclosed herein may be performed, in accordance with various embodiments.

The scientific instrument support methods disclosed herein may include interactions with a human user (e.g., via the user local computing device 520 discussed herein with reference to FIG. 5). These interactions may include providing information to the user (e.g., information regarding the operation of a scientific instrument such as the scientific instrument 510 of FIG. 5, information regarding a sample being analyzed or other test or measurement performed by a scientific instrument, information retrieved from a local or remote database, or other information) or providing an option for a user to input commands (e.g., to control the operation of a scientific instrument such as the scientific instrument 510 of FIG. 5, or to control the analysis of data generated by a scientific instrument), queries (e.g., to a local or remote database), or other information. In some embodiments, these interactions may be performed through the GUI 300 that includes a visual display on a display device (e.g., the display device 410 discussed herein with reference to FIG. 4) that provides outputs to the user and/or prompts the user to provide inputs (e.g., via one or more input devices, such as a keyboard, mouse, trackpad, or touchscreen, included in the other I/O devices 412 discussed herein with reference to FIG. 4). The scientific instrument support systems disclosed herein may include any suitable GUIs for interaction with a user.

FIG. 3 depicts an example GUI 300 that may be used in the performance of some or all of the support methods disclosed herein, in accordance with various embodiments. As noted above, the GUI 300 may be provided on a display device (e.g., the display device 410 discussed herein with reference to FIG. 4) of a computing device (e.g., the computing device 400 discussed herein with reference to FIG. 4) of a scientific instrument support system (e.g., the scientific instrument support system 500 discussed herein with reference to FIG. 5), and a user may interact with the GUI 300 using any suitable input device (e.g., any of the input devices included in the other I/O devices 412 discussed herein with reference to FIG. 4) and input technique (e.g., movement of a cursor, motion capture, facial recognition, gesture detection, voice recognition, actuation of buttons, etc.).

The GUI 300 may include a data display region 302, a data analysis region 304, a scientific instrument control region 306, and a settings region 308. The particular number and arrangement of regions depicted in FIG. 3 is simply illustrative, and any number and arrangement of regions, including any desired features, may be included in a GUI 300.

The data display region 302 may display data generated by a scientific instrument (e.g., the scientific instrument 510 discussed herein with reference to FIG. 5). For example, the data display region 302 may display raw data samples taken by a mass spectrometer that are selected by the experiment manager logic 102 and/or processed data that has been processed by the data analysis logic 104 according to a method selected by the experiment manager logic 102.

The data analysis region 304 may display the results of data analysis (e.g., the results of analyzing the data illustrated in the data display region 302 and/or other data). For example, the data analysis region 304 may display output data in the form of output files. The output data may be data that is processed by the data analysis logic 104 according to a method and workflow. In some embodiments, the data display region 302 and the data analysis region 304 may be combined in the GUI 300 (e.g., to include data output from a scientific instrument, and some analysis of the data, in a common graph or region).

The scientific instrument control region 306 may include options that allow the user to control a scientific instrument (e.g., the scientific instrument 510 discussed herein with reference to FIG. 5). For example, the scientific instrument control region 306 may include control features of a mass spectrometer.

The settings region 308 may include options that allow the user to control the features and functions of the GUI 300 (and/or other GUIs) and/or perform common computing operations with respect to the data display region 302 and data analysis region 304 (e.g., saving data on a storage device, such as the storage device 404 discussed herein with reference to FIG. 4, sending data to another user, labeling data, etc.). For example, the settings region 308 may include options to re-process data that has been processed and output and/or select certain raw data files from input data.

Data representations like those of FIGS. 8-15B and FIGS. 21-23 may be included in any appropriate region of a GUI (e.g., in the data display region 302 or the data analysis region 304 of the GUI 300).

As noted above, the scientific instrument support module 100 may be implemented by one or more computing devices. FIG. 4 is a block diagram of a computing device 400 that may perform some or all of the scientific instrument support methods disclosed herein, in accordance with various embodiments. In some embodiments, the scientific instrument support module 100 may be implemented by a single computing device 400 or by multiple computing devices 400. Further, as discussed below, a computing device 400 (or multiple computing devices 400) that implements the scientific instrument support module 100 may be part of one or more of the scientific instrument 510, the user local computing device 520, the service local computing device 530, or the remote computing device 540 of FIG. 5.

The computing device 400 of FIG. 4 is illustrated as having a number of components, but any one or more of these components may be omitted or duplicated, as suitable for the application and setting. In some embodiments, some or all of the components included in the computing device 400 may be attached to one or more motherboards and enclosed in a housing (e.g., including plastic, metal, and/or other materials). In some embodiments, some these components may be fabricated onto a single system-on-a-chip (SoC) (e.g., an SoC may include one or more processing devices 402 and one or more storage devices 404). Additionally, in various embodiments, the computing device 400 may not include one or more of the components illustrated in FIG. 4, but may include interface circuitry (not shown) for coupling to the one or more components using any suitable interface (e.g., a Universal Serial Bus (USB) interface, a High-Definition Multimedia Interface (HDMI) interface, a Controller Area Network (CAN) interface, a Serial Peripheral Interface (SPI) interface, an Ethernet interface, a wireless interface, or any other appropriate interface). For example, the computing device 400 may not include a display device 410, but may include display device interface circuitry (e.g., a connector and driver circuitry) to which a display device 410 may be coupled.

The computing device 400 may include a processing device 402 (e.g., one or more processing devices, an electronic processor, etc.). As used herein, the term "processing device" may refer to any device or portion of a device that processes electronic data from registers and/or memory to transform that electronic data into other electronic data that may be stored in registers and/or memory. The processing device 402 may include one or more digital signal processors (DSPs), application-specific integrated circuits (ASICs), central processing units (CPUs), graphics processing units (GPUs), cryptoprocessors (specialized processors that execute cryptographic algorithms within hardware), server processors, or any other suitable processing devices.

The computing device 400 may include a storage device 404 (e.g., one or more storage devices). The storage device 404 may include one or more memory devices such as random access memory (RAM) (e.g., static RAM (SRAM) devices, magnetic RAM (MRAM) devices, dynamic RAM (DRAM) devices, resistive RAM (RRAM) devices, or conductive-bridging RAM (CBRAM) devices), hard drive-based memory devices, solid-state memory devices, networked drives, cloud drives, or any combination of memory devices. In some embodiments, the storage device 404 may include memory that shares a die with a processing device 402. In such an embodiment, the memory may be used as cache memory and may include embedded dynamic random access memory (eDRAM) or spin transfer torque magnetic random access memory (STT-MRAM), for example. In some embodiments, the storage device 404 may include non-transitory computer readable media having instructions thereon that, when executed by one or more processing devices (e.g., the processing device 402), cause the computing device 400 to perform any appropriate ones of or portions of the methods disclosed herein.

The computing device 400 may include an interface device 406 (e.g., one or more interface devices 406). The interface device 406 may include one or more communication chips, connectors, and/or other hardware and software to govern communications between the computing device 400 and other computing devices. For example, the interface device 406 may include circuitry for managing wireless communications for the transfer of data to and from the computing device 400. The term "wireless" and its derivatives may be used to describe circuits, devices, systems, methods, techniques, communications channels, etc., that may communicate data through the use of modulated electromagnetic radiation through a nonsolid medium. The term does not imply that the associated devices do not contain any wires, although in some embodiments they might not. Circuitry included in the interface device 406 for managing wireless communications may implement any of a number of wireless standards or protocols, including but not limited to Institute for Electrical and Electronic Engineers (IEEE) standards including Wi-Fi (IEEE 802.11 family), IEEE 802.16 standards (e.g., IEEE 802.16-2005 Amendment), Long-Term Evolution (LTE) project along with any amendments, updates, and/or revisions (e.g., advanced LTE project, ultra mobile broadband (UMB) project (also referred to as "3GPP2"), etc.). In some embodiments, circuitry included in the interface device 406 for managing wireless communications may operate in accordance with a Global System for Mobile Communication (GSM), General Packet Radio Service (GPRS), Universal Mobile Telecommunications System (UMTS), High Speed Packet Access (HSPA), Evolved HSPA (E-HSPA), or LTE network. In some embodiments, circuitry included in the interface device 406 for managing wireless communications may operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). In some embodiments, circuitry included in the interface device 406 for managing wireless communications may operate in accordance with Code Division Multiple Access (CDMA), Time Division Multiple Access (TDMA), Digital Enhanced Cordless Telecommunications (DECT), Evolution-Data Optimized (EV-DO), and derivatives thereof, as well as any other wireless protocols that are designated as 3G, 4G, 5G, and beyond. In some embodiments, the interface device 406 may include one or more antennas (e.g., one or more antenna arrays) to receipt and/or transmission of wireless communications.

In some embodiments, the interface device 406 may include circuitry for managing wired communications, such as electrical, optical, or any other suitable communication protocols. For example, the interface device 406 may include circuitry to support communications in accordance with Ethernet technologies. In some embodiments, the interface device 406 may support both wireless and wired communication, and/or may support multiple wired communication protocols and/or multiple wireless communication protocols. For example, a first set of circuitry of the interface device 406 may be dedicated to shorter-range wireless communications such as Wi-Fi or Bluetooth, and a second set of circuitry of the interface device 406 may be dedicated to longer-range wireless communications such as global positioning system (GPS), EDGE, GPRS, CDMA, WiMAX, LTE, EV-DO, or others. In some embodiments, a first set of circuitry of the interface device 406 may be dedicated to wireless communications, and a second set of circuitry of the interface device 406 may be dedicated to wired communications.

The computing device 400 may include battery/power circuitry 408. The battery/power circuitry 408 may include one or more energy storage devices (e.g., batteries or capacitors) and/or circuitry for coupling components of the computing device 400 to an energy source separate from the computing device 400 (e.g., AC line power).

The computing device 400 may include a display device 410 (e.g., multiple display devices). The display device 410 may include any visual indicators, such as a heads-up display, a computer monitor, a projector, a touchscreen display, a liquid crystal display (LCD), a light-emitting diode display, or a flat panel display.

The computing device 400 may include other input/output (I/O) devices 412. The other I/O devices 412 may include one or more audio output devices (e.g., speakers, headsets, earbuds, alarms, etc.), one or more audio input devices (e.g., microphones or microphone arrays), location devices (e.g., GPS devices in communication with a satellite-based system to receive a location of the computing device 400, as known in the art), audio codecs, video codecs, printers, sensors (e.g., thermocouples or other temperature sensors, humidity sensors, pressure sensors, vibration sensors, accelerometers, gyroscopes, etc.), image capture devices such as cameras, keyboards, cursor control devices such as a mouse, a stylus, a trackball, or a touchpad, bar code readers, Quick Response (QR) code readers, or radio frequency identification (RFID) readers, for example.

The computing device 400 may have any suitable form factor for its application and setting, such as a handheld or mobile computing device (e.g., a cell phone, a smart phone, a mobile internet device, a tablet computer, a laptop computer, a netbook computer, an ultrabook computer, a personal digital assistant (PDA), an ultra mobile personal computer, etc.), a desktop computing device, or a server computing device or other networked computing component.

One or more computing devices implementing any of the scientific instrument support modules or methods disclosed herein may be part of a scientific instrument support system. FIG. 5 is a block diagram of an example scientific instrument support system 500 in which some or all of the scientific instrument support methods disclosed herein may be performed, in accordance with various embodiments. The scientific instrument support modules and methods disclosed herein (e.g., the scientific instrument support module 100 of FIG. 1 and the method 200 of FIG. 2) may be implemented by one or more of the scientific instrument 510, the user local computing device 520, the service local computing device 530, or the remote computing device 540 of the scientific instrument support system 500.

Any of the scientific instrument 510, the user local computing device 520, the service local computing device 530, or the remote computing device 540 may include any of the embodiments of the computing device 400 discussed herein with reference to FIG. 4, and any of the scientific instrument 510, the user local computing device 520, the service local computing device 530, or the remote computing device 540 may take the form of any appropriate ones of the embodiments of the computing device 400 discussed herein with reference to FIG. 4.

The scientific instrument 510, the user local computing device 520, the service local computing device 530, or the remote computing device 540 may each include a processing device 502, a storage device 504, and an interface device 506. The processing device 502 may take any suitable form, including the form of any of the processing devices 402 discussed herein with reference to FIG. 4, and the processing devices 502 included in different ones of the scientific instrument 510, the user local computing device 520, the service local computing device 530, or the remote computing device 540 may take the same form or different forms. The storage device 504 may take any suitable form, including the form of any of the storage devices 504 discussed herein with reference to FIG. 4, and the storage devices 504 included in different ones of the scientific instrument 510, the user local computing device 520, the service local computing device 530, or the remote computing device 540 may take the same form or different forms. The interface device 506 may take any suitable form, including the form of any of the interface devices 406 discussed herein with reference to FIG. 4, and the interface devices 506 included in different ones of the scientific instrument 510, the user local computing device 520, the service local computing device 530, or the remote computing device 540 may take the same form or different forms.

The scientific instrument 510, the user local computing device 520, the service local computing device 530, and the remote computing device 540 may be in communication with other elements of the scientific instrument support system 500 via communication pathways 508. The communication pathways 508 may communicatively couple the interface devices 506 of different ones of the elements of the scientific instrument support system 500, as shown, and may be wired or wireless communication pathways (e.g., in accordance with any of the communication techniques discussed herein with reference to the interface devices 406 of the computing device 400 of FIG. 4). The particular scientific instrument support system 500 depicted in FIG. 5 includes communication pathways between each pair of the scientific instrument 510, the user local computing device 520, the service local computing device 530, and the remote computing device 540, but this "fully connected" implementation is simply illustrative, and in various embodiments, various ones of the communication pathways 508 may be absent. For example, in some embodiments, a service local computing device 530 may not have a direct communication pathway 508 between its interface device 506 and the interface device 506 of the scientific instrument 510, but may instead communicate with the scientific instrument 510 via the communication pathway 508 between the service local computing device 530 and the user local computing device 520 and the communication pathway 508 between the user local computing device 520 and the scientific instrument 510.

The user local computing device 520 may be a computing device (e.g., in accordance with any of the embodiments of the computing device 400 discussed herein) that is local to a user of the scientific instrument 510. In some embodiments, the user local computing device 520 may also be local to the scientific instrument 510, but this need not be the case; for example, a user local computing device 520 that is in a user's home or office may be remote from, but in communication with, the scientific instrument 510 so that the user may use the user local computing device 520 to control and/or access data from the scientific instrument 510. In some embodiments, the user local computing device 520 may be a laptop, smartphone, or tablet device. In some embodiments the user local computing device 520 may be a portable computing device. In some embodiments, the user local computing device 520 may locally perform the method 200 of FIG. 2.

The service local computing device 530 may be a computing device (e.g., in accordance with any of the embodiments of the computing device 400 discussed herein) that is local to an entity that services the scientific instrument 510. For example, the service local computing device 530 may be local to a manufacturer of the scientific instrument 510 or to a third-party service company. In some embodiments, the service local computing device 530 may communicate with the scientific instrument 510, the user local computing device 520, and/or the remote computing device 540 (e.g., via a direct communication pathway 508 or via multiple "indirect" communication pathways 508, as discussed above) to receive data regarding the operation of the scientific instrument 510, the user local computing device 520, and/or the remote computing device 540 (e.g., the results of self-tests of the scientific instrument 510, calibration coefficients used by the scientific instrument 510, the measurements of sensors associated with the scientific instrument 510, etc.). In some embodiments, the service local computing device 530 may communicate with the scientific instrument 510, the user local computing device 520, and/or the remote computing device 540 (e.g., via a direct communication pathway 508 or via multiple "indirect" communication pathways 508, as discussed above) to transmit data to the scientific instrument 510, the user local computing device 520, and/or the remote computing device 540 (e.g., to update programmed instructions, such as firmware, in the scientific instrument 510, to initiate the performance of test or calibration sequences in the scientific instrument 510, to update programmed instructions, such as software, in the user local computing device 520 or the remote computing device 540, etc.). A user of the scientific instrument 510 may utilize the scientific instrument 510 or the user local computing device 520 to communicate with the service local computing device 530 to report a problem with the scientific instrument 510 or the user local computing device 520, to request a visit from a technician to improve the operation of the scientific instrument 510, to order consumables or replacement parts associated with the scientific instrument 510, or for other purposes.

The remote computing device 540 may be a computing device (e.g., in accordance with any of the embodiments of the computing device 400 discussed herein) that is remote from the scientific instrument 510 and/or from the user local computing device 520. In some embodiments, the remote computing device 540 may be included in a datacenter or other large-scale server environment. In some embodiments, the remote computing device 540 may include network-attached storage (e.g., as part of the storage device 504). The remote computing device 540 may store data generated by the scientific instrument 510, perform analyses of the data generated by the scientific instrument 510 (e.g., in accordance with programmed instructions), facilitate communication between the user local computing device 520 and the scientific instrument 510, and/or facilitate communication between the service local computing device 530 and the scientific instrument 510.

In some embodiments, one or more of the elements of the scientific instrument support system 500 illustrated in FIG. 5 may not be present. Further, in some embodiments, multiple ones of various ones of the elements of the scientific instrument support system 500 of FIG. 5 may be present. For example, a scientific instrument support system 500 may include multiple user local computing devices 520 (e.g., different user local computing devices 520 associated with different users or in different locations). In another example, a scientific instrument support system 500 may include multiple scientific instruments 510, all in communication with service local computing device 530 and/or a remote computing device 540; in such an embodiment, the service local computing device 530 may monitor these multiple scientific instruments 510, and the service local computing device 530 may cause updates or other information may be "broadcast" to multiple scientific instruments 510 at the same time. Different ones of the scientific instruments 510 in a scientific instrument support system 500 may be located close to one another (e.g., in the same room) or farther from one another (e.g., on different floors of a building, in different buildings, in different cities, etc.). In some embodiments, a scientific instrument 510 may be connected to an Internet-of-Things (IoT) stack that allows for command and control of the scientific instrument 510 through a web-based application, a virtual or augmented reality application, a mobile application, and/or a desktop application. Any of these applications may be accessed by a user operating the user local computing device 520 in communication with the scientific instrument 510 by the intervening remote computing device 540. In some embodiments, a scientific instrument 510 may be sold by the manufacturer along with one or more associated user local computing devices 520 as part of a local scientific instrument computing unit 5012.

In some embodiments, different ones of the scientific instruments 510 included in a scientific instrument support system 500 may be different types of scientific instruments 510; for example, one scientific instrument 510 may be a mass spectrometer, while another scientific instrument 510 may be a gas chromatography device. In some such embodiments, the remote computing device 540 and/or the user local computing device 520 may combine data from different types of scientific instruments 510 included in a scientific instrument support system 500.

Figure 6:
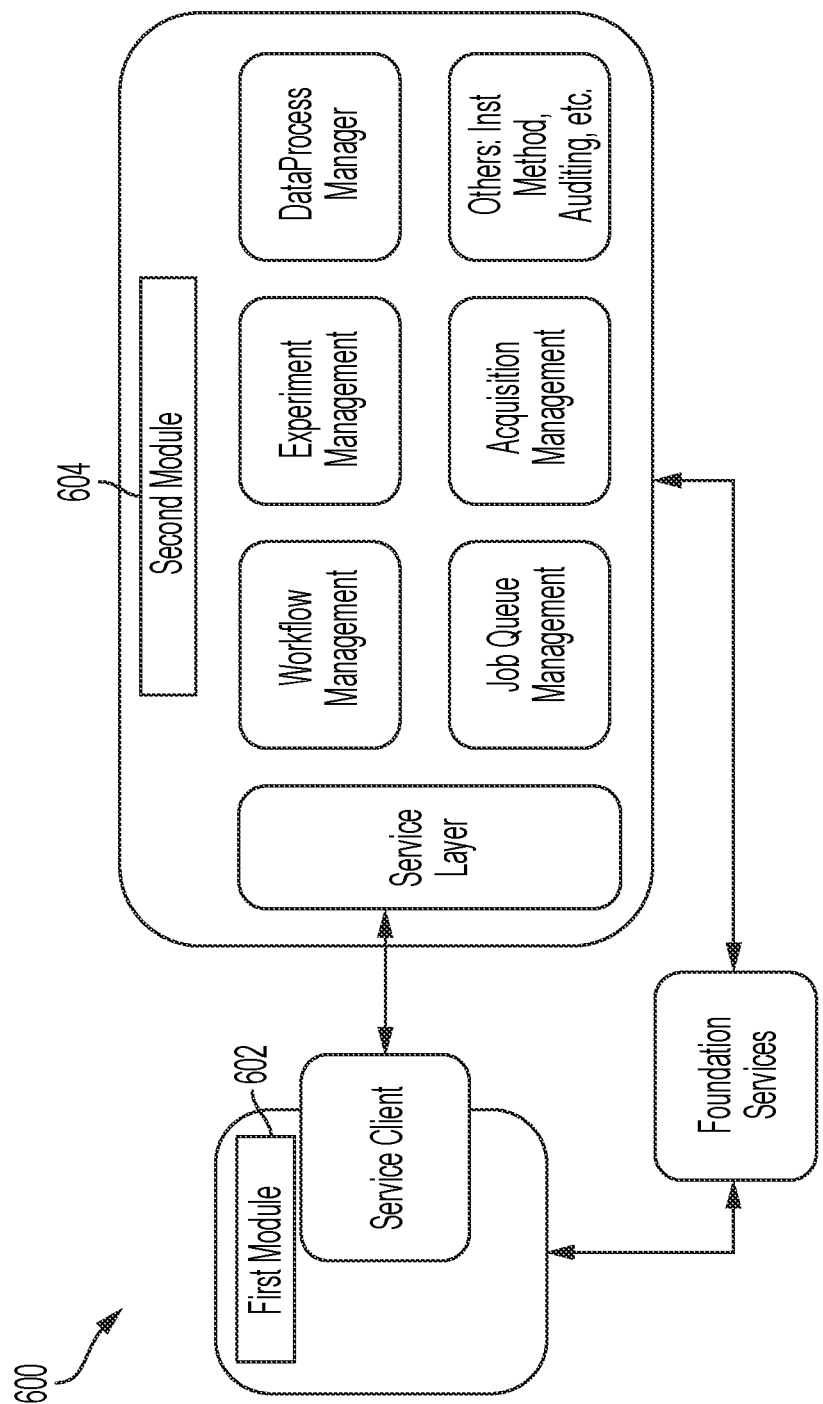
FIG. 6 is a block diagram of an example system architecture in which some or all of the scientific instrument support operations disclosed herein may be performed, in accordance with various embodiments.

FIG. 6 is a block diagram of a system architecture 600. The system architecture 600 may be implemented across the devices of the scientific instrument support system 500. The system architecture 600 includes a first module 602 and a second module 604. In some embodiments, the first module is implemented on a user device, such as the user local computing device 520, and the second module may be implemented on one of the user device and/or a remote device, such as service local computing device 530 and/or a remote computing device 540. The first module 602 includes a service client that corresponds with a service layer of the second module 604. The second module 604 further includes a workflow management sub-module, an experiment management sub-module, a dataprocess manager sub-module, a job queue management sub-module, an acquisition management sub-module, other additional sub-modules, or a combination thereof. In some embodiments, the second module 604 includes the support module 100. For example, the second module 604 may include the experiment manager logic 102, the data analysis logic 104, and the output logic 106. Alternatively, in some embodiments, the support module 100 is split between the first module 602 and the second module 604. Both the first module 602 and the second module 604 communicate with foundation services. In some embodiments, foundation services are responsible for managing an acquisition queue and performing sample acquisitions. For example, the foundation services control the acquisition management sub-module of the second module 604.

Figure 7:
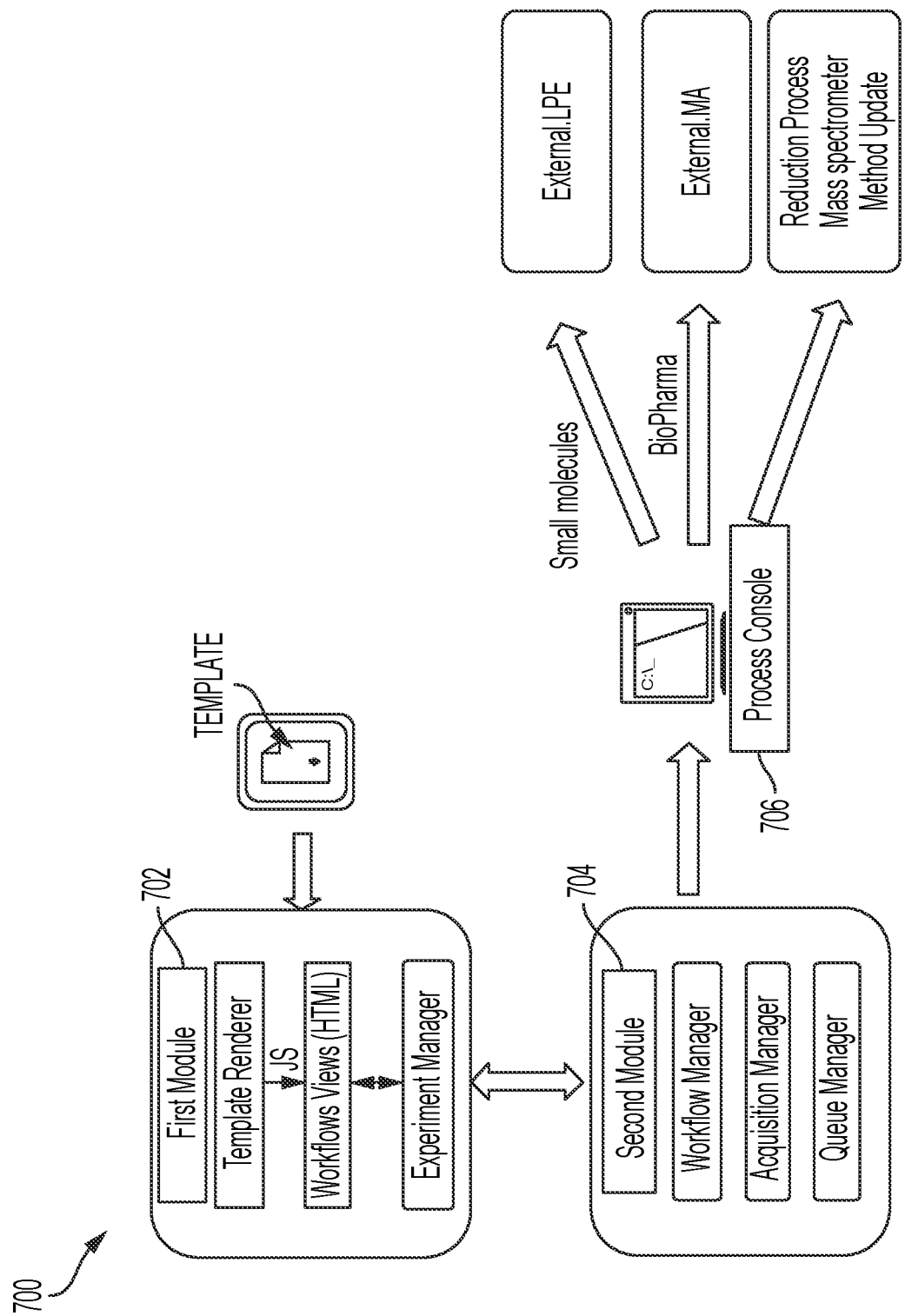
FIG. 7 is a block diagram of a first example workflow system in which some or all of the scientific instrument support operations disclosed herein may be performed, in accordance with various embodiments.

FIG. 7 is a block diagram of a first example workflow system 700 implemented using the system architecture 600. In some embodiments, the workflow system 700 may be used by the scientific instrument support system 500. The example workflow system 700 includes a first module 702, a second module 704, a process console 706, other processing modules, or a combination thereof. The first module 702 may include a template renderer, a workflow view, and an experiment manager, such as experiment manager logic 102 as described above. The template renderer may provide templates (for example, workflow templates) that are selected by the experiment manager logic 102 and displayed in a workflow view the experiment manager logic 102 displays on a GUI for selection by a user (see, e.g., FIG. 9). In some embodiments, the templates are displayed in a HTML format (see, e.g., FIG. 10). The second module 704 may include a workflow manager, an acquisition manager, and a queue manager. The process console 706 may process the data. The second module 704 and the process console 706 may be a part of the data analysis logic 104 as described above. The process console 706 outputs data corresponding to the system process selected (e.g., small molecules or biopharmaceutical). In some embodiments, data corresponding to small molecules process that are selected by the experiment manager logic 102 and processed by the data analysis logic 104 are sent to an external Luna Processing Engine (External.LPE). In some embodiments, the Luna Processing Engine (LPE) processes and determines components lists and creates inclusion lists, exclusion lists, or a combination thereof. The process console 706 may also output data to a reduction process and a mass spectrometer method update module. For example, the reduction process includes removing a triggered data (e.g., mass-per-charge ratio) from the inclusion list and adding the triggered data to the exclusion list in order to mitigate the triggered data from being triggered again. In some embodiments, after the reduction process, the updated inclusion list and the updated exclusion list may be incorporated into the acquisition manager of the second module 704 for use in subsequent experiments. When a system process corresponding to biopharmaceuticals is selected, data provided by the experiment manager logic 102 and processed by the data analysis logic 104 is sent to an external Mass Analyzer process module (External.MA) to determine components and further process the data to create list(s) In some embodiments, the External.MA may be included in the data analysis logic 104.

Figure 8:
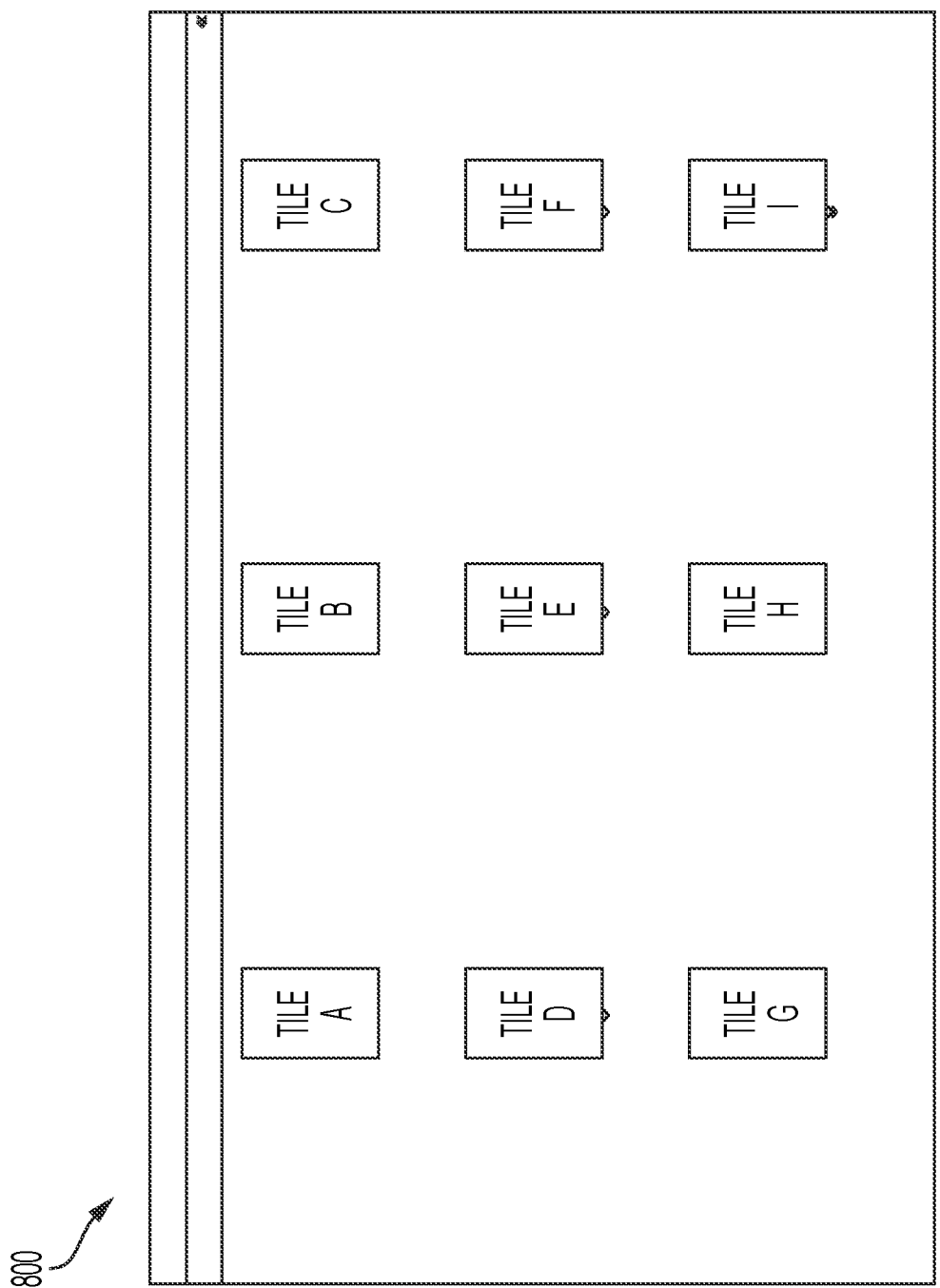
FIG. 8 illustrates a first graphical user interface displayed in the performance of some or all of the scientific instrument support operations disclosed herein, in accordance with various embodiments.

FIG. 8 is an example of a first GUI 800. The first GUI 800 includes multiples selectable tiles. The tiles include, among other tiles, a first tile and a second tile. The first tile corresponds to a first system process for small molecules and the second tile corresponds to a second system process for large molecules. When a tile is selected, the experiment manager logic 102 selects the workflows corresponding to the system process.

Figure 9:
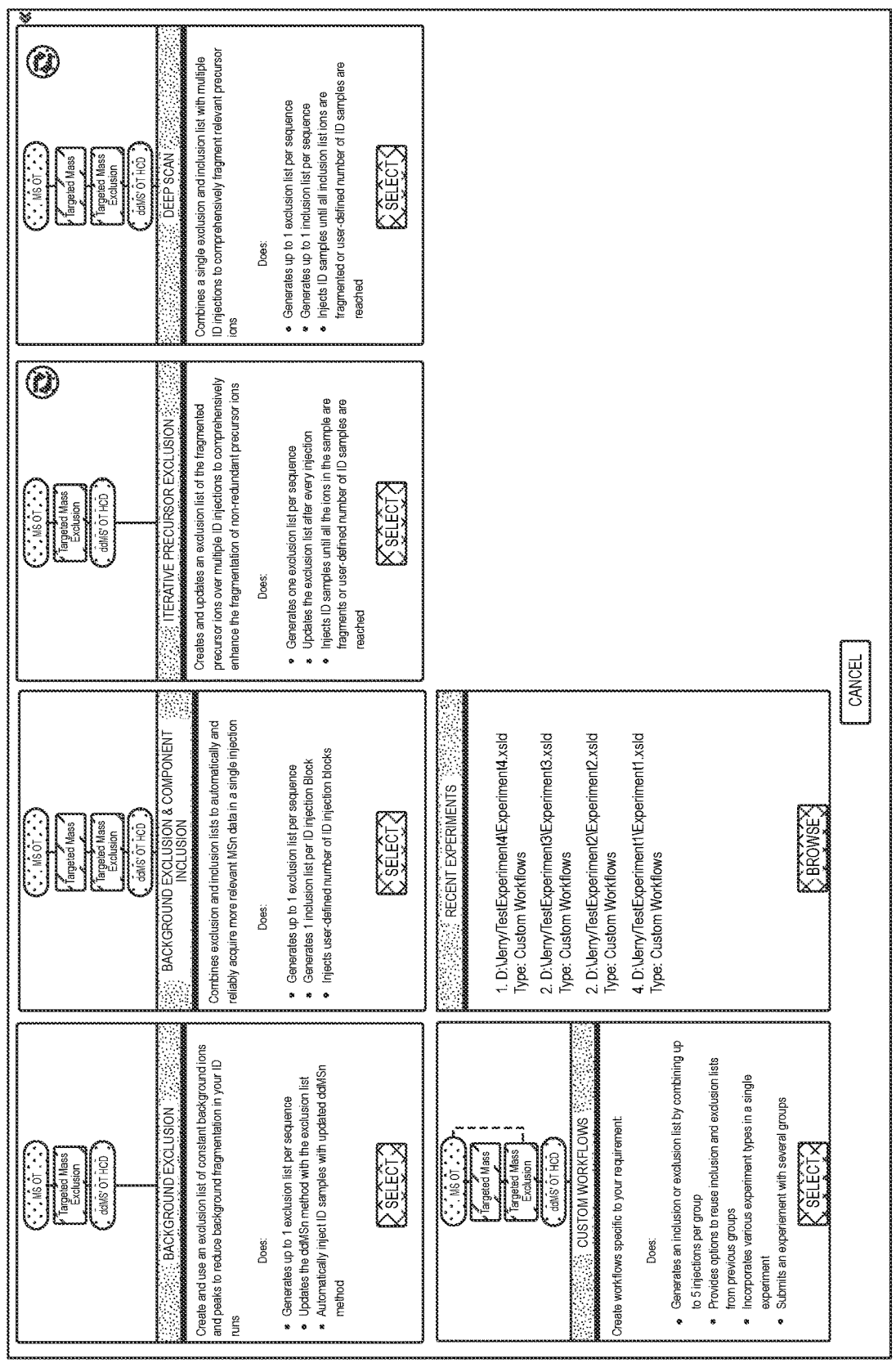
FIG. 9 illustrates a second graphical user interface displayed in the performance of some or all of the scientific instrument support operations disclosed herein, in accordance with various embodiments.

FIG. 9 is an example of a second GUI 900. The second GUI 900 may be displayed in response to the selection of the first tile and, thus, may correspond to a small molecule system process. The second GUI 900 displays multiple workflows that are selectable by a user to initiate the selected workflow. The workflows include background exclusion workflow, a background exclusion and component inclusion workflow, an iterative precursor exclusion workflow, a deep scan workflow, and a custom workflow. Additionally, an experiment in progress may be resumed based on a selection within the second GUI 900.

Figure 10:
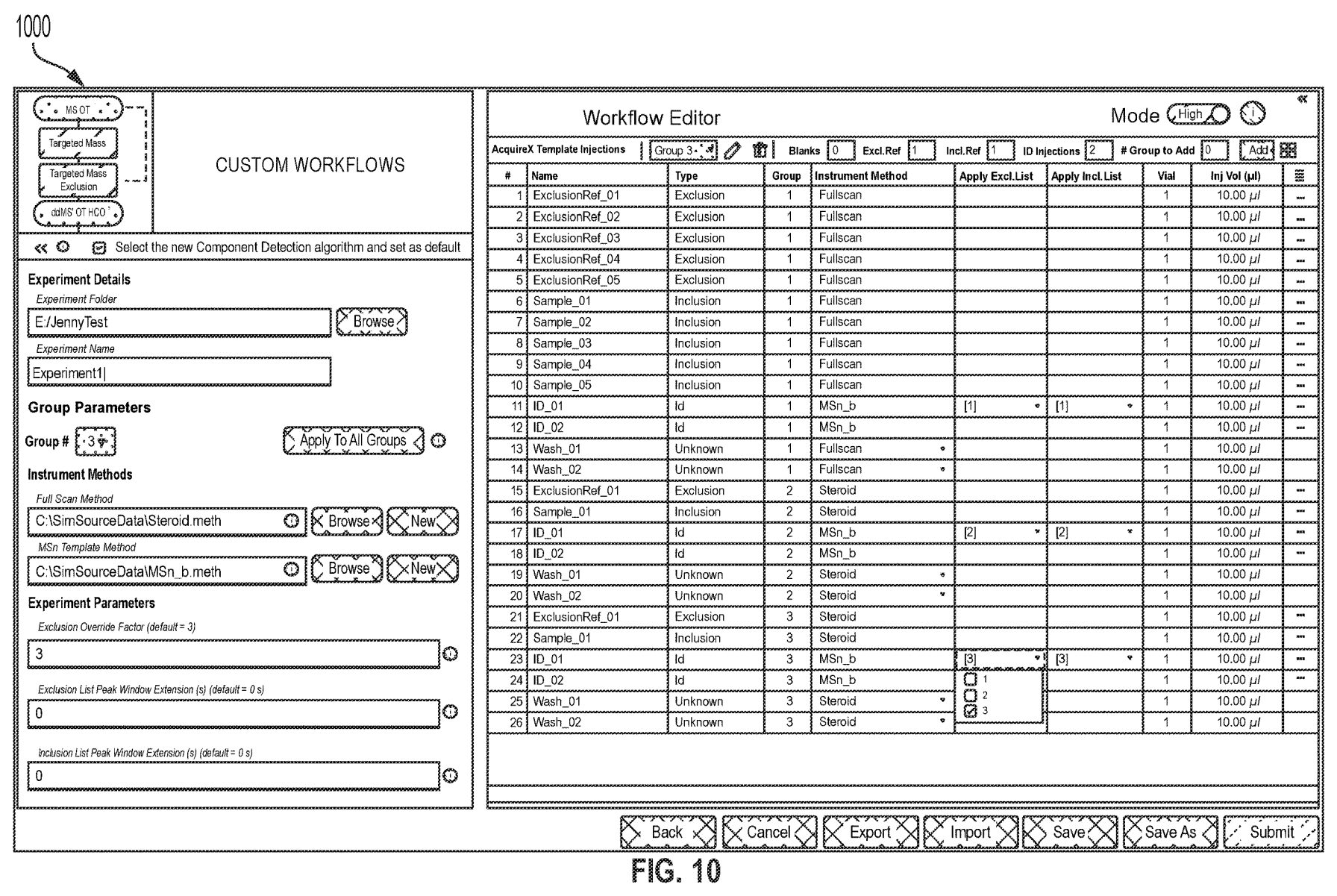

FIG. 10 is an example of a third GUI 1000. The third GUI 1000 may be displayed in response to the selection of the custom workflow on the second GUI 900. The third GUI 1000 may include an "experiment details" display and a "workflow editor" display. The "experiment details" display may include parameter inputs such as text boxes and drop-down menus to select parameters. Parameters may include inclusion and exclusion parameters that the data analysis logic 104 uses to create inclusion and exclusion lists. In some embodiments, inclusion and exclusion lists may be defined for multiple groups. The "workflow editor" display may include the data to be analyzed as well as columns providing details regarding the data. Columns may be directed towards data numbers, data names, data types, group numbers (for example, group identifiers), instrument methods, exclusion list application, inclusion list application, vial number, sample volume, etc.

Each data that is selected by the data analysis logic 104 may be a part of an experiment group. For example, group 1 may include a first grouping of data and group 2 may include a second grouping of data. In some embodiments, the second grouping of data may contain the same data as the first group of data. An list may be input for each data. In some embodiments, a drop-down may be provided in the exclusion column that allows a user to select an exclusion list from a specific group. For example, a selection of a "1" on the drop-down menu of line 11 of data may be received that indicates that the exclusion list from group 1 is applied to the data displayed on line 11. The third GUI 1000 additionally includes a taskbar at the top of the workflow editor display and processing buttons including back, cancel, export, import, save, save as, and submit at the bottom of the workflow editor display. The data analysis logic 104 applies a process corresponding to selected processing button.

Figure 11:
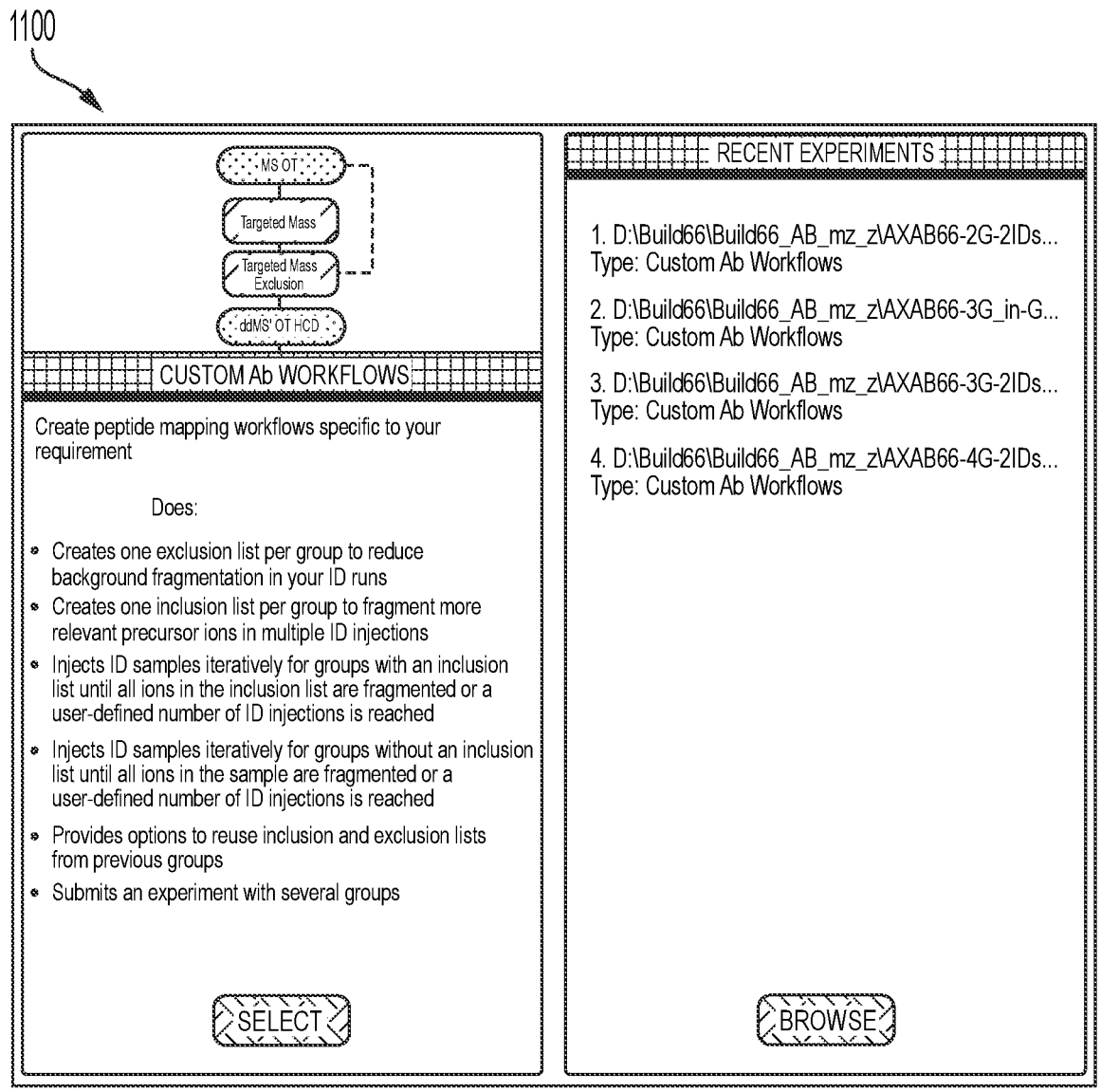
FIG. 11 illustrates a fourth graphical user interface displayed in the performance of some or all of the scientific instrument support operations disclosed herein, in accordance with various embodiments.

FIG. 11 is an example of a fourth GUI 1100. The fourth GUI 1100 may be displayed in response to the selection of the second tile and, thus, may correspond to a large molecule system process. The fourth GUI 1100 displays a selectable workflow corresponding to custom biopharmaceutical workflow. Additionally, the experiment in progress may be resumed based on a selection within the fourth GUI 1100.

Figure 12:
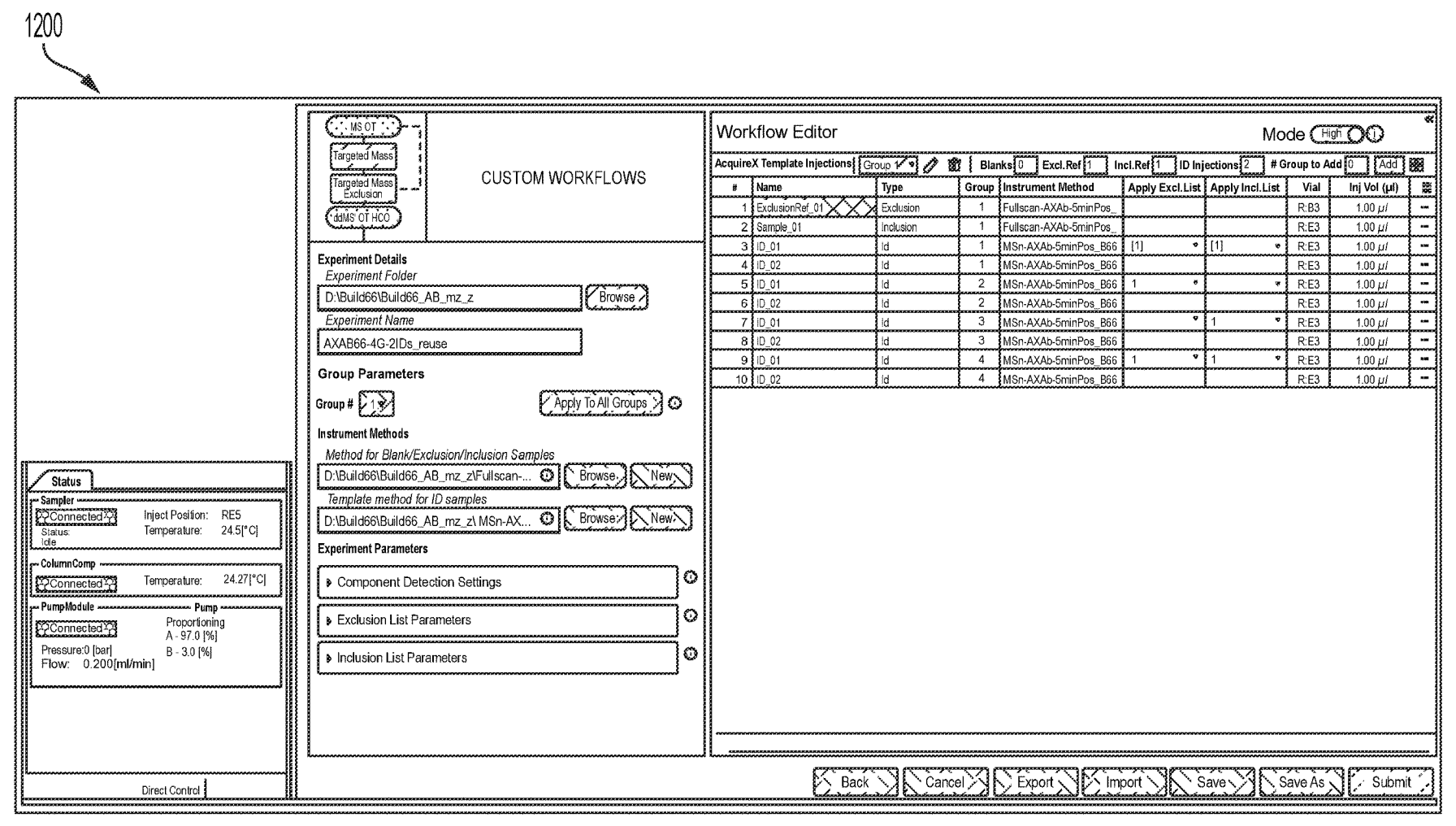

FIG. 12 is an example of a fifth GUI 1200. The fifth GUI 1200 may be displayed in response to the selection of the custom workflow on the fourth GUI 1100. The fifth GUI 1200 may include a status display, an experiment details display, and a workflow editor display. The status display may include a status of a mass spectrometer, sampler, column comp., and a pump module. These statuses may correspond to scientific instruments. The experiment status may also be displayed in the status display. The user may toggle between the experiment status and an acquisition queue. The experiment details display may include parameter inputs such as text boxes and drop-down menus to select parameters. Parameters may include inclusion and exclusion parameters that the data analysis logic 104 uses to create inclusion and exclusion lists. In some embodiments, inclusion and exclusion lists may be defined for one specific group or multiple groups. The workflow editor display may include the data to be analyzed as well as columns providing details regarding the data. Columns may be directed towards data numbers, data names, data types, group numbers, instrument methods, exclusion list application, inclusion list application, vial number, sample volume, etc.

Each data that is selected by the data analysis logic 104 may be a part of a group. For example, group 1 may include a first grouping of data and group 2 may include a second grouping of data. In some embodiments, the second grouping of data may contain the same data as the first group of data. A list may be input for each data. In some embodiments, a drop-down may be provided in the exclusion column that allows a user to select an exclusion list from a specific group. For example, a selection of a "1" on the drop-down menu of line 11 of data may be received that indicates that the exclusion list from group 1 is applied to the data displayed on line 11. The fifth GUI 1200 additionally includes a taskbar at the top of the workflow editor display and processing buttons including back, cancel, export, import, save, save as, and submit at the bottom of the workflow editor display. The data analysis logic 104 applies a process corresponding to selected processing button.

Figure 13:
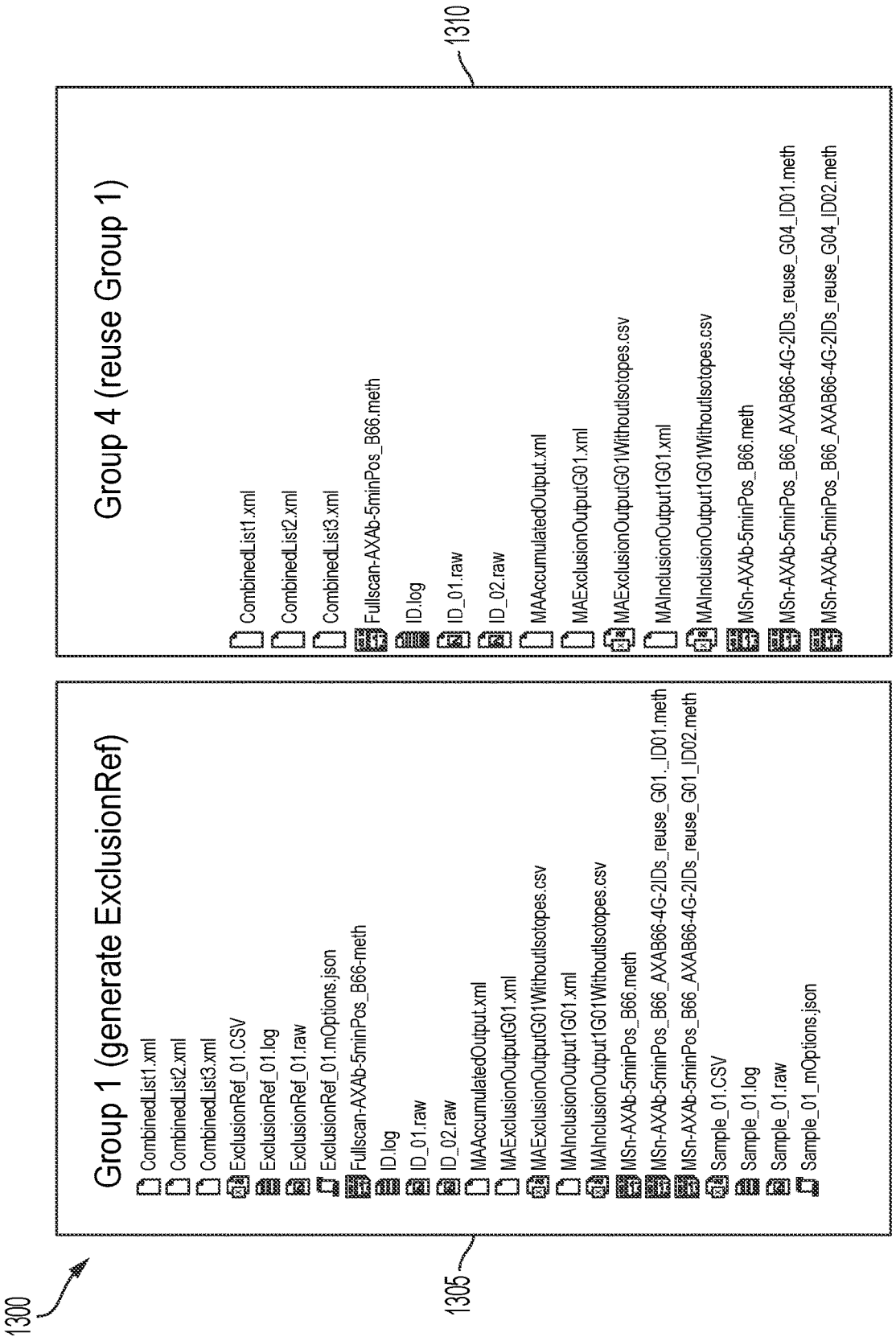
FIG. 13 illustrates a sixth graphical user interface displayed in the performance of some or all of the scientific instrument support operations disclosed herein, in accordance with various embodiments.

FIG. 13 is an example of a sixth GUI 1300. The sixth GUI 1300 may be an output that is output by the output logic 106. The output may be presented as a listing of files in a folder corresponding to a group number. For example, a first output window 1305 may display the output corresponding to the workflow process of Group 1 (for example, of a first experiment), as processed by the data analysis logic 104, and a second output window 1010 may display the output corresponding to the workflow process of Group 4 (for example, of a second experiment), which used the output of Group 1 as an input. The output may be a combination of data and methods and may include an output of the inclusion/exclusion list(s) defined by the parameters input and processed by the data analysis logic 104.

Figure 14:
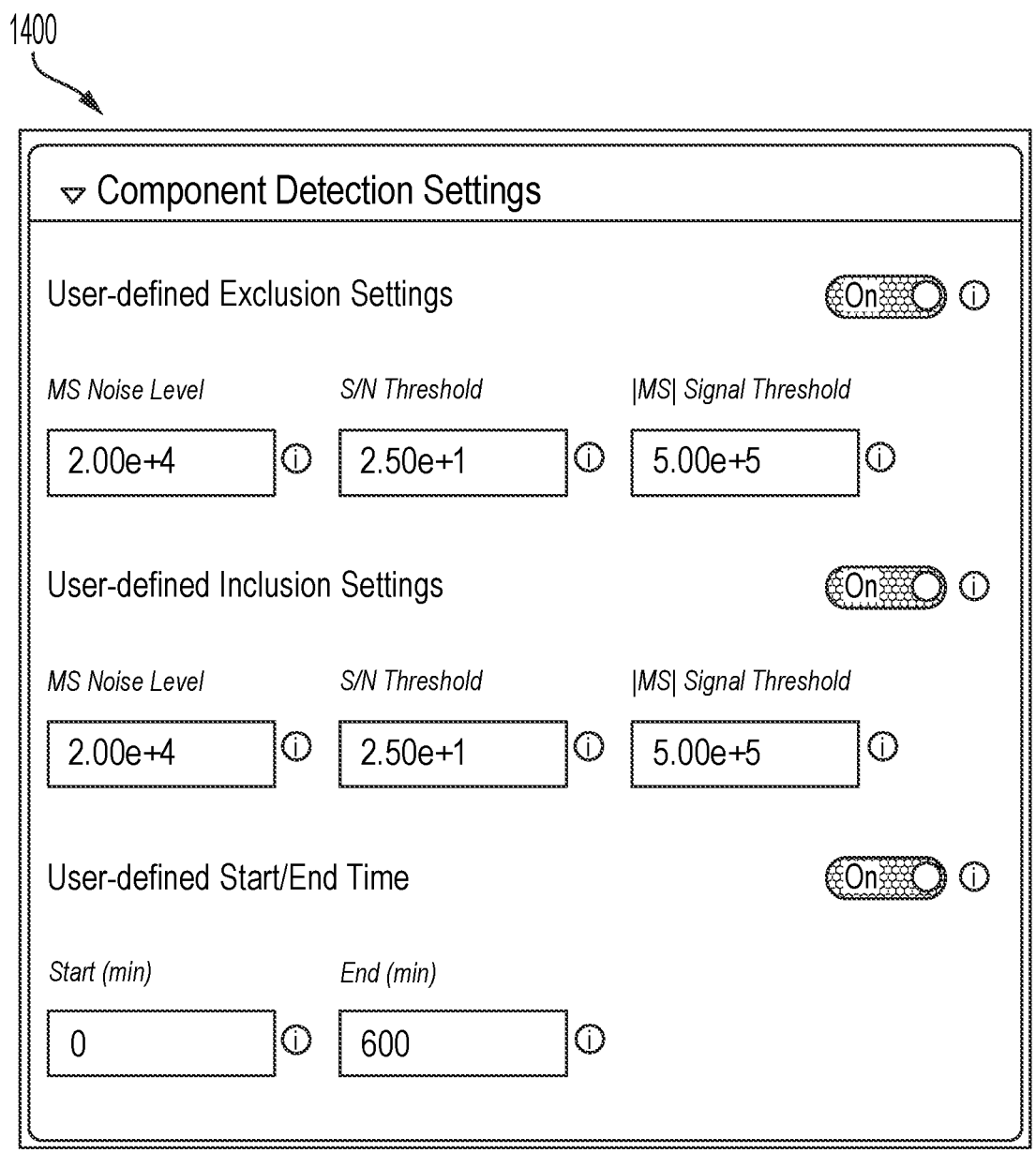
FIG. 14 illustrates a seventh graphical user interface displayed in the performance of some or all of the scientific instrument support operations disclosed herein, in accordance with various embodiments.

FIG. 14 is an example of a seventh GUI 1400. The seventh GUI 1400 may be displayed in response to a drop-down being selected in the experiment details display of the third GUI 1000 or the fifth GUI 1200. When the drop-down in selected, the seventh display 1400 provides textboxes corresponding to exclusion settings, inclusion settings, and time settings. The seventh display 1400 includes toggle buttons for each setting that, when toggled on, allow the user to define the settings. In some embodiments, the data analysis logic 104 may automatically define the settings. In some embodiments, automatic defilement of the settings is the default. Data logs may be added to each group to capture the defined parameters for list setting(s) for each group.

For the exclusion settings and the inclusion settings, the first text box is provided to receive a mass spectrometer (MS) noise level input, the second text box is provided for to receive a signal to noise threshold (S/N threshold) input, and the third textbox is an output that is automatically calculated by the data analysis logic 104 based on the MS noise level and the S/N threshold. For the time settings, a first text box corresponds to a start time and a second blank corresponds to an end time. The timing unit may be one of seconds or minutes.

FIG. 15A is an example of an eighth GUI 1500. The eighth GUI 1500 may be displayed in response to a drop-down being selected in the experiment details display of the third GUI 1000 or the fifth GUI 1200. When the drop-down in selected, the eighth GUI 1500 provides text boxes corresponding to an exclusion override factor, an exclusion list peak window extension, an exclusion duration, and a mass to charge (m/z) tolerance. The eighth GUI 1500 also includes a check box that, when checked, adds isotopes to the exclusion list. The data analysis logic 104 may additionally determine isotope assignments with the most intense mass-to-charge (m/z) ratio to create a list. Toggle buttons are also provided including a first toggle button corresponding to a user-defined minimum intensity and a second toggle button corresponding to a user-defined charge state. The method with which the data analysis logic 104 processes experiment data from the scientific instrument 510 may update according to an updated list for each group. The updated method may be used for acquisition of a first data in each group.

When the check box is checked, isotopes are added to the exclusion list by the data analysis logic 104 from the detected components in the exclusion reference and after the targeted components of the inclusion are added to the exclusion list. Isotope peaks for each peak in a mass analyzer result are added to the exclusion list and displayed in the workflow editor display. The isotope peaks may be provided as an output by the output logic and may be denoted by a file ending in ".CSV". In some embodiments, the isotopes added for a first experiment group may be applied to a second experiment group when the second experiment group is analyzed using a selection of the first experiment group.

When the check box is not checked, isotopes are not automatically added to the exclusion list. In some embodiments, regardless of the state of the check box, additional text boxes may be provided corresponding to a user-defined minimum intensity and a user-defined charge state. These parameters are applied to the exclusion list after component detection for a specific group. Subsequent groups can set the parameters as filtering criteria for the data samples that are designated to the exclusion list.

FIG. 15B is an example of a ninth GUI 1550. The ninth GUI 1550 may be displayed in response to a drop-down being selected in the experiment details display of the third GUI 1000 or the fifth GUI 1200. When the drop-down in selected, the ninth GUI 1550 provides text boxes corresponding to an inclusion list peak window extension, an inclusion list peak fragmentation threshold, an m/z tolerance, a user-defined minimum intensity, and a user-defined charge state. The ninth GUI 1550 includes toggle buttons including a first toggle button corresponding to the user-defined minimum intensity and a second toggle button corresponding to the user-defined charge state. These parameters are applied to the inclusion list after component detection for a specific group. Subsequent groups can set the parameters as filtering criteria for the data samples that are designated to the inclusion list.

Figure 16:
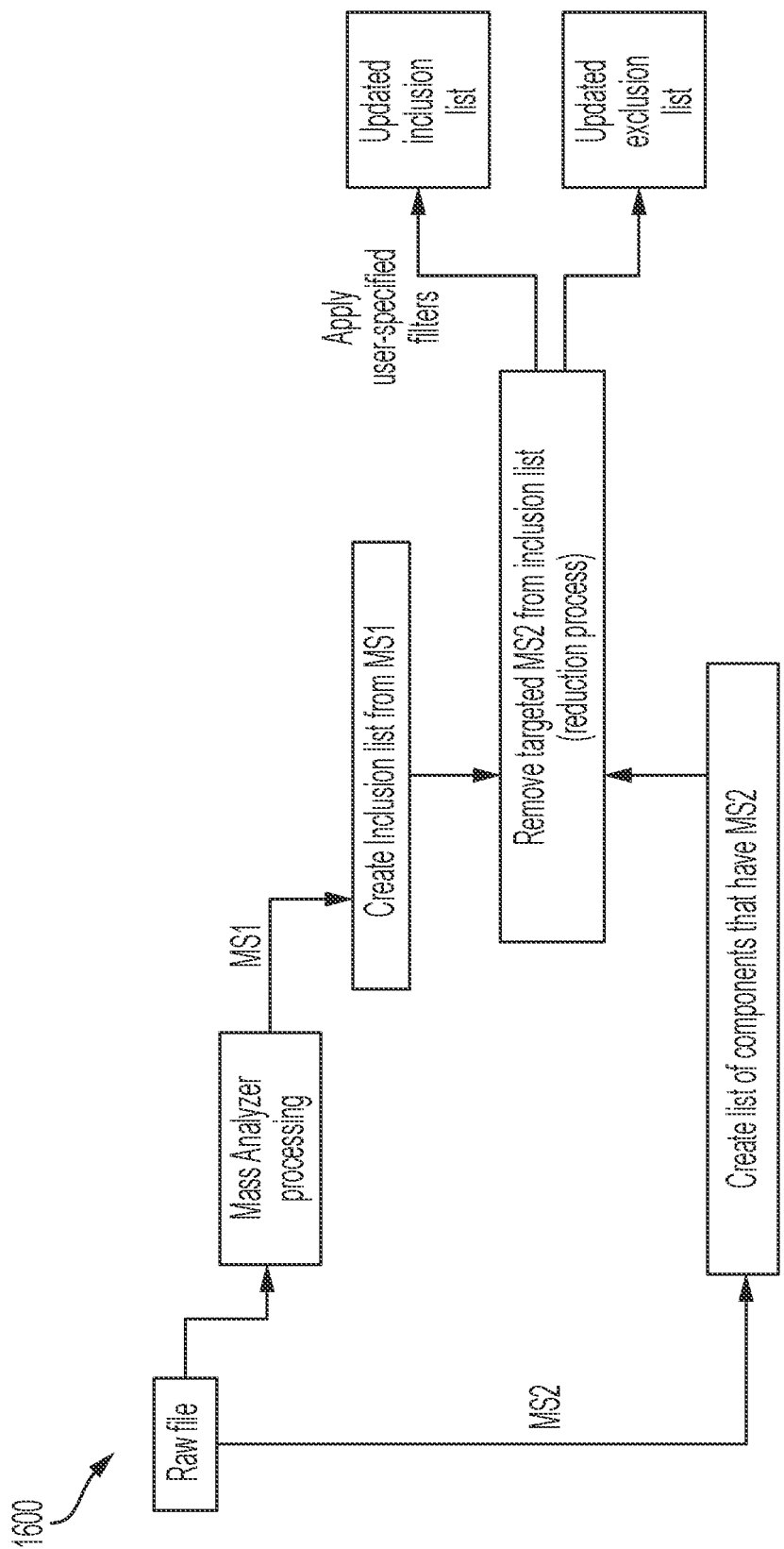
FIG. 16 is a flow diagram of an example method of performing scientific instrument support operations, in accordance with various embodiments.

FIG. 16 is a flow diagram 1600 of an example method of performing a support operation by the data analysis logic 104. The support operation is for updating inclusion and exclusion lists during a tandem mass spectrometry process. A raw file from the tandem mass spectrometers is passed through a mass analyzer processor to create a list from first scans of the mass spectrometer. The inclusion list includes, for example, a list of components provided as m/z ratios at a predetermined retention time with a predetermined intensity resulting from a mass spectrometer full scan. The raw file also includes second scans from the mass spectrometer that are processed to add precursor ions from the second scans to an exclusion list and remove the ions from the inclusion list. For example, the precursor ions may be fragmented and, thus, may be undesirable in the data. Moving the fragmented ions to the exclusion list excludes the fragmented ions from the next ID sample. The updated exclusion list updates a template method (for example, MSn template method for ID samples) for an acquisition of a first ID sample of a group.

FIG. 17A is a block diagram 1700 of a method of data execution performed by the experiment manager logic 102 and the data analysis logic 104. The method illustrated in FIG. 17A may be used with the list reuse functionality described above or separate from such functionality. As illustrated in FIG. 17A, the data analysis logic 104 processes data using at least three steps: pre-acquisition action (PREA), acquisition action (ACQA), and post-acquisition action (POSTA). In one example, PREA may include processing user input experiment parameters to determine inclusion and/or exclusion lists, ACQA may include performing and receiving experiment data using the scientific instrument 510, and POSTA may include determining the result of the experiment by applying the experiment parameters to the experiment data. Typically, PREA, ACQA, and POSTA for one ID sample (or one injection) may be performed in order one after another. However, PREA, ACQA, and POSTA for multiple ID sample (or injections) may be performed using parallel processing to improve the throughput of the support module 100.

POSTA may be executed in parallel with one PREA or one ACQA. In some embodiments, one POSTA may be processed by the data analysis logic 104 at a time. Alternatively, or additionally, in some embodiments, multiple POSTA may be processed in parallel. In some embodiments, a PREA may be delayed until the processing of multiple POSTA are complete since the PREA may rely on outputs of previous POSTAs.

FIG. 17A illustrates one example method of parallel processing of four different ID samples (or injections). A first sample includes PREA 1, ACQA 1, and POSTA 1. A second sample includes PREA 2, ACQA 2, and POSTA 2. A third sample includes PREA 3, ACQA 3, and POSTA 3. A fourth sample includes PREA 4, ACQA 4, and POSTA 4. The first sample, the second sample, the third sample, and the fourth sample may be queued such that these samples are performed in order one after the other. In the example illustrated, PREA 4 depends on the results of POSTA 3 and therefore cannot be performed until completion of POSTA 3. Once PREA 1 and ACQA 1 are completed, a first parallel process may perform PREA 2 and ACQA 2 simultaneously with a second parallel process performing POSTA 1. However, performance of PREA 4 and ACQA 4 are stopped until complete of POSTA 3.

FIG. 17B is a block diagram 1750 of a method of data execution including an error as handled by the data analysis logic 104. Similar to the method illustrated in FIG. 17A, the method illustrated in FIG. 17B may be used with the list reuse functionality described above or separate from such functionality. As illustrated in FIG. 17B, in response to receiving a user selection (through a GUI 300) of a "continue with error" option, errors may be ignored by the data analysis logic 104. When the "continue with error" option is not selected, the data analysis logic 104 pauses the acquisition queue and handles an error. When the POSTA encounters an error, queued POSTA are cleared. When an injection or PREA encounters an error, the POSTA is continued. When the acquisition queue resumes (for example, after the data analysis logic 104 handles the error), data is reinjected starting from the step with error (injection, PREA, or POSTA). When the "continue with error" option is selected, queued POSTA are cleared, and the data analysis logic 104 moves onto processing the next group or experiments.

In the case that an experiment is stopped from being processed by the data analysis logic 104 (for example, in response to the data analysis logic 104 receiving a "stop" command through a GUI 300), samples with ACQA that are completed may have a POSTA queued, and queued POSTAs may continue to be executed. When the experimental job is resumed (for example, in response to the data analysis logic 104 receiving a "start" command through a GUI), the job proceeds with the data associated with the aborted acquisition or the next data after the error handling of the POSTA. When an active experimental job being processed by the data analysis logic 104 is deleted from the queue (based on a user selection within the GUI), an active POSTA is terminated, and any queued POSTA are cleared.

Figure 18:
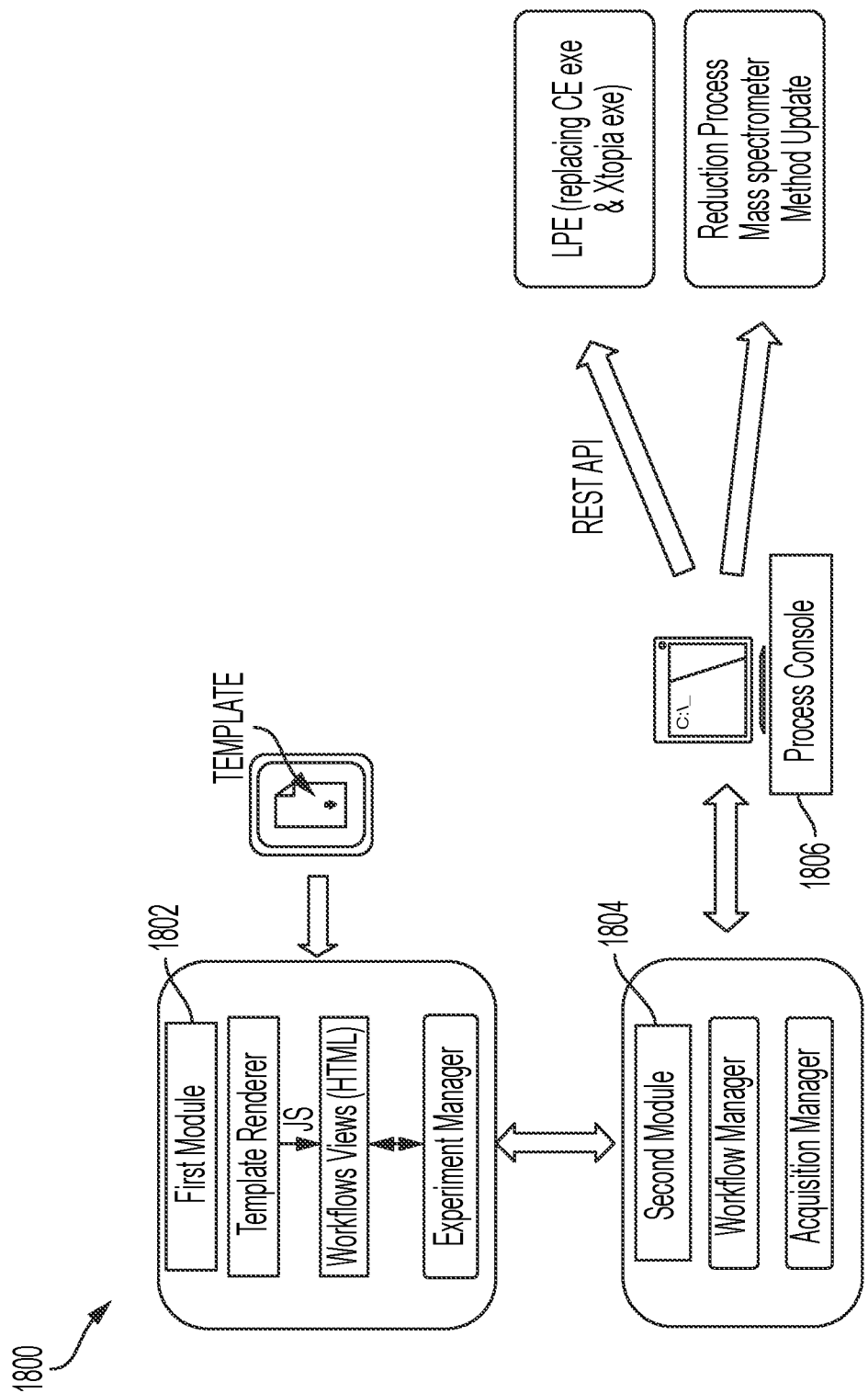
FIG. 18 is a block diagram of a second example workflow system in which some or all of the scientific instrument support operations disclosed herein may be performed, in accordance with various embodiments.

FIG. 18 is a block diagram of a second example workflow system 1800. In some embodiments, the second example workflow system 1800 may be implemented in place of the first example workflow system 700. Alternatively, in some embodiments, the first example workflow system 700 may be provided in place of the second example workflow system 700. In some embodiments, the second workflow system 1800 may be implemented by the scientific instrument support system 500. The second workflow system 1800 includes a first module 1802, a second module 1804, a process console 1806, and processing modules. The first module 1802 may include a template renderer, a workflow view, and an experiment manager, such as experiment manager logic 102. The template renderer may provide templates that are selected by the experiment manager logic 102 to display on a GUI (for example, tenth GUI 1900) so that a template may be provided to the experiment manager logic based on a user selection. The second module 1804 may include a workflow manager and an acquisition manager. The process console 1806 may process the data. The second module 1804 and the process console 1806 may be a part of the data analysis logic 104. The process console 1806 outputs to at least one of an LPE and a reduction process and a mass spectrometer method update.

Figure 19:
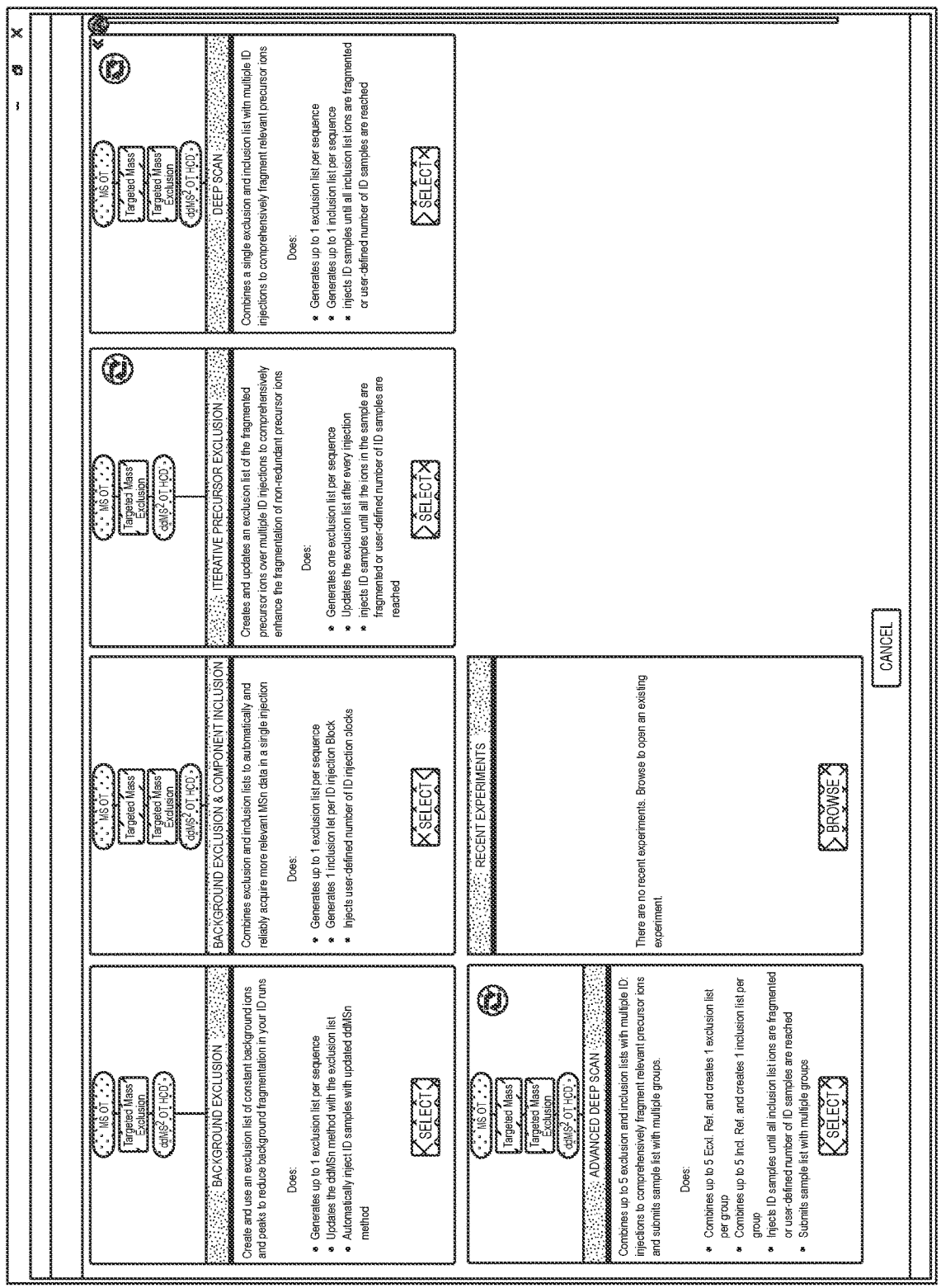
FIG. 19 illustrates a tenth graphical user interface displayed in the performance of some or all of the scientific instrument support operations disclosed herein, in accordance with various embodiments.

FIG. 19 is an example of a tenth GUI 1900. The tenth GUI 1900 displays multiple workflows that may be initiated based on a user selection. The workflows include background exclusion workflow, a background exclusion and component inclusion workflow, an iterative precursor exclusion workflow, a deep scan workflow, and an advanced deep scan workflow. Additionally, an experiment in progress may be resumed based on a user selection within the tenth GUI 1900.

Figure 20:
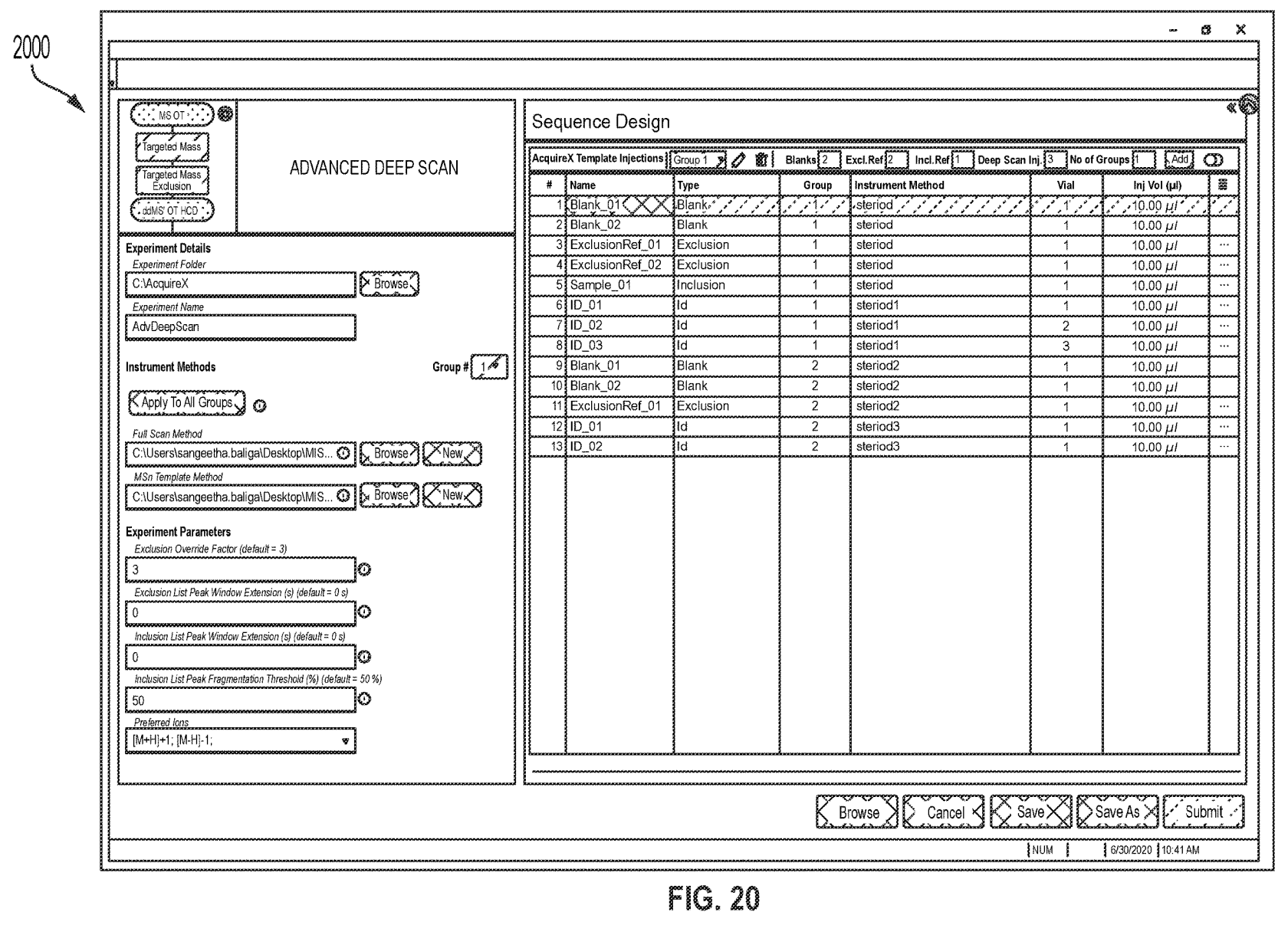

FIG. 20 is an example of an eleventh GUI 2000. The eleventh GUI 2000 may be displayed in response to the advanced deep scan workflow being selected within the tenth GUI 1900. The eleventh GUI 2000 may include an experiment details display and a sequence design display. The experiment details display may include parameter inputs such as fill-in-the-blanks and drop-down menus to select parameters. Parameters may include inclusion and exclusion parameters that the data analysis logic 104 uses to create inclusion and exclusion lists. In some embodiments, inclusion and exclusion lists may be defined for multiple groups. The sequence design display may include the data to be analyzed as well as columns providing details regarding the data. Columns may be directed towards data numbers, data names, data types, group numbers, instrument methods, vial number, sample volume, etc.

Each data that is selected by the data analysis logic 104 may be a part of a group. For example, group 1 may include a first grouping of data and group 2 may include a second grouping of data. The eleventh GUI 2000 additionally includes a taskbar at the top of the sequence design display and processing buttons including back, cancel, save, save as, and submit at the bottom of the sequence design display. The data analysis logic 104 applies a process corresponding to selected processing button.

Figure 21:
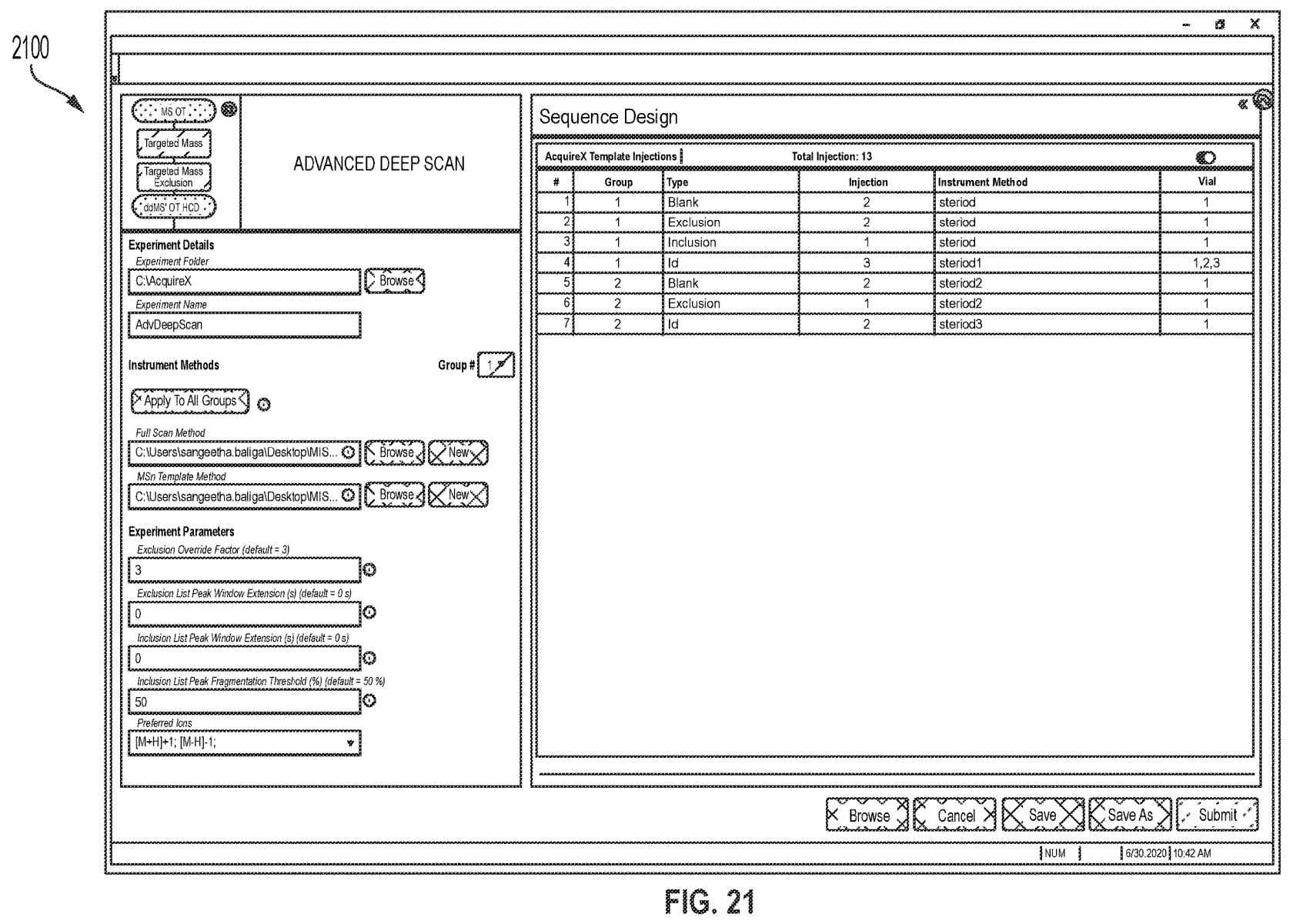

FIG. 21 is an example of a twelfth GUI 2100. The twelfth GUI 2100 is a group summary view of the groups of data displayed in the eleventh GUI 2000 and may be displayed in response to a selection of a button on the eleventh GUI 2000. Columns may be directed towards data numbers, data types, group numbers, instrument methods, and vial number.

Figure 22:
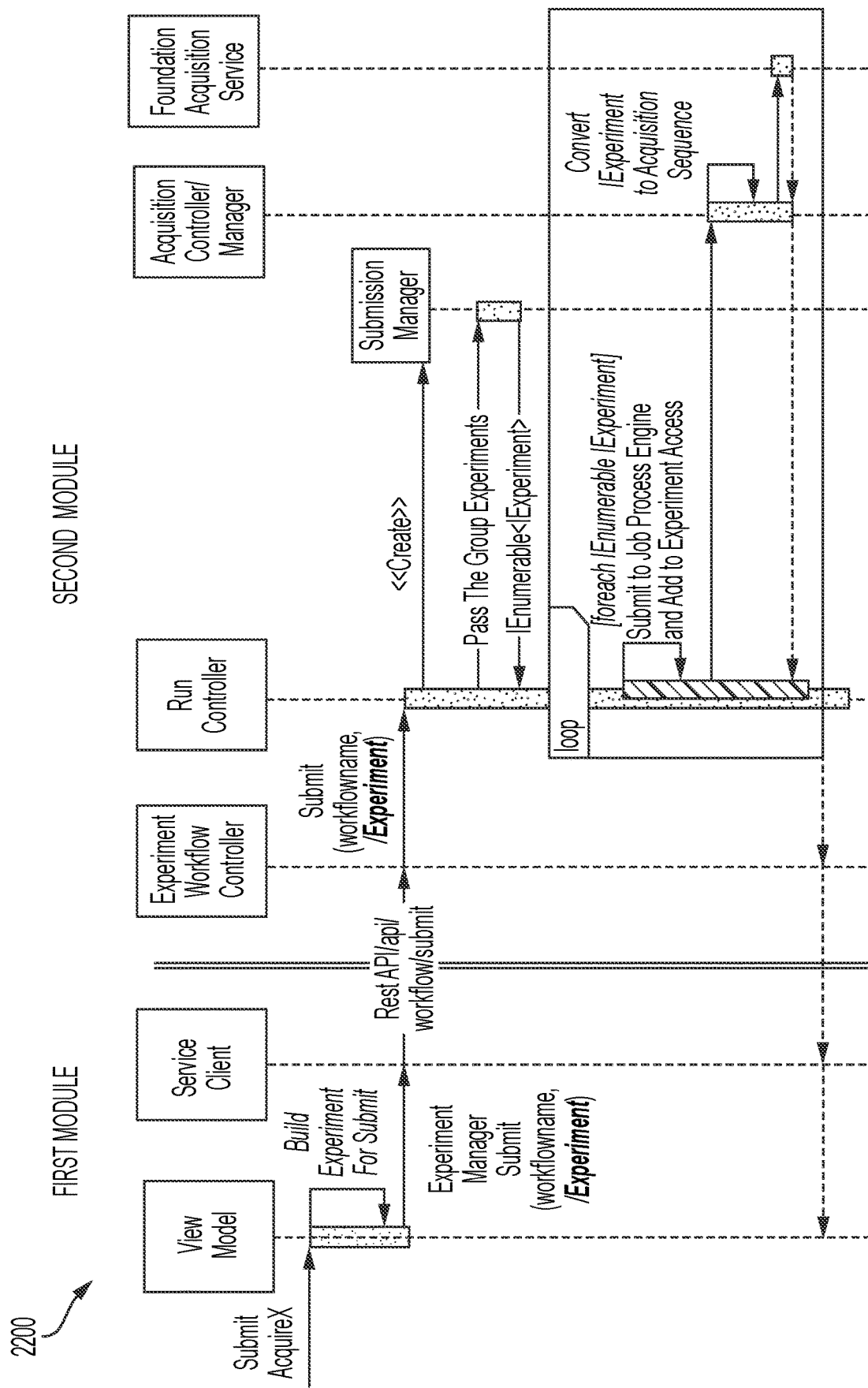
FIG. 22 is a flow diagram of an example method of performing scientific instrument support operations, in accordance with various embodiments.

FIG. 22 is a flow diagram of an example method 2200 of performing scientific instrument support operations. The method 2200 may be used with the list reuse functionality described above or separate from such functionality. For example, in some embodiments, the data analysis logic 104 may employ a multi-group batch submission during an experiment. The first module, such as first module 1802, may build the experiment prior to the second module, such as second module 1804, performing the experiment. The experiment may be performed according to steps outlined in the second module. The experiment includes a loop that enables the output of an experiment to be feedback to a next experiment. For example, the output of a first experiment (for example, group 1) may be used as an experiment parameter for a second experiment.

Figure 23:
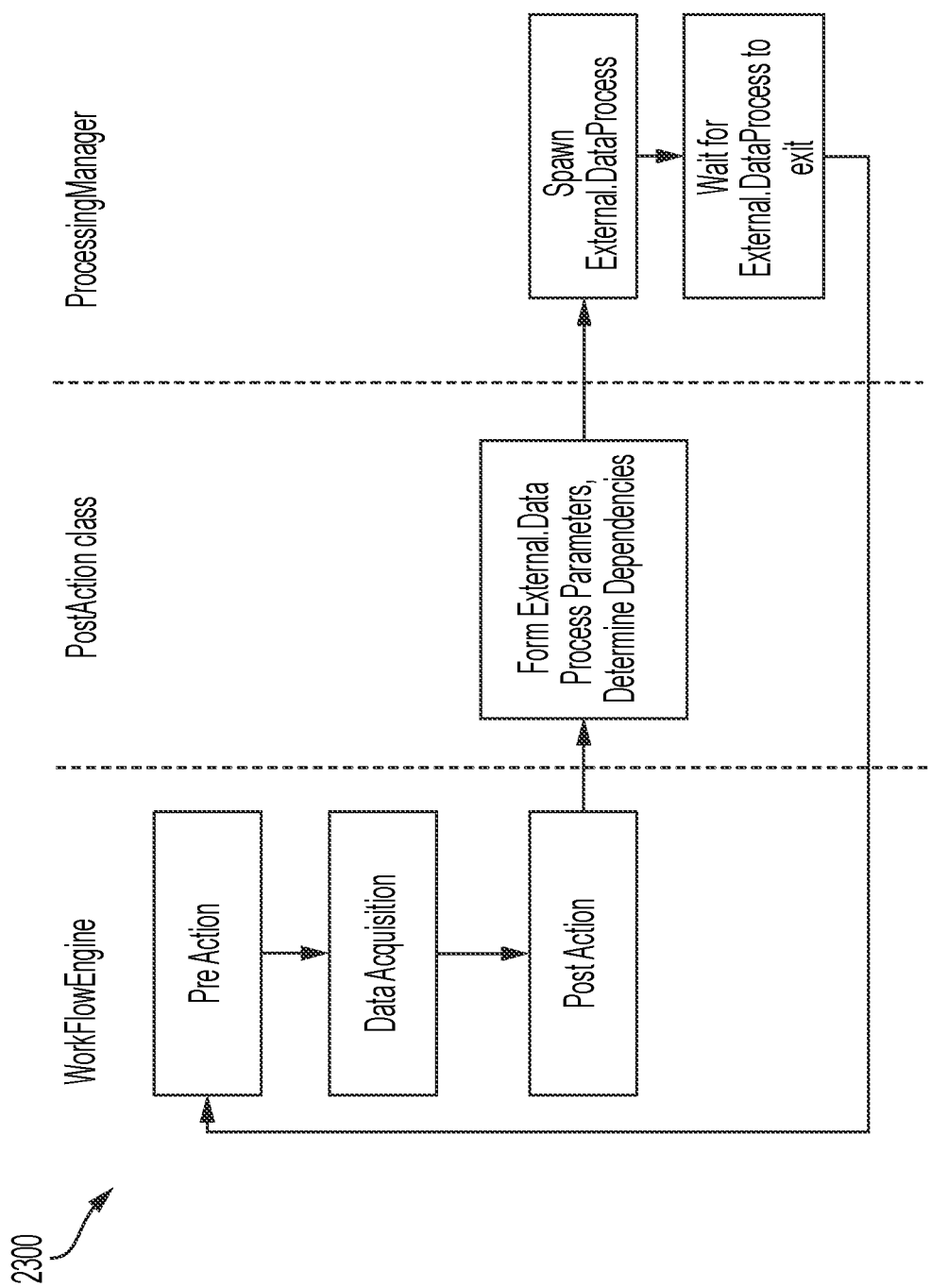
FIG. 23 is a flow diagram of an example method of performing a workflow execution process, in accordance with various embodiments.

FIG. 23 is a flow diagram of an example method 2300 of performing a workflow execution process. The support module 100 may perform a workflow execution process for a first experiment. In some embodiments, the experiment manager logic 102 performs pre-action that includes determining which method files to use in the experiment and performing data acquisition, which selects raw data samples collected by the scientific instrument (e.g., mass spectrometry data) in the "WorkFlowEngine". In some embodiments, the data analysis logic 104 performs post action on the raw data prior to triggering the processing of the raw files during the "PostAction class". In some embodiments, the data analysis logic performs processing on the output files during the "ProcessingManager".

Figure 24:
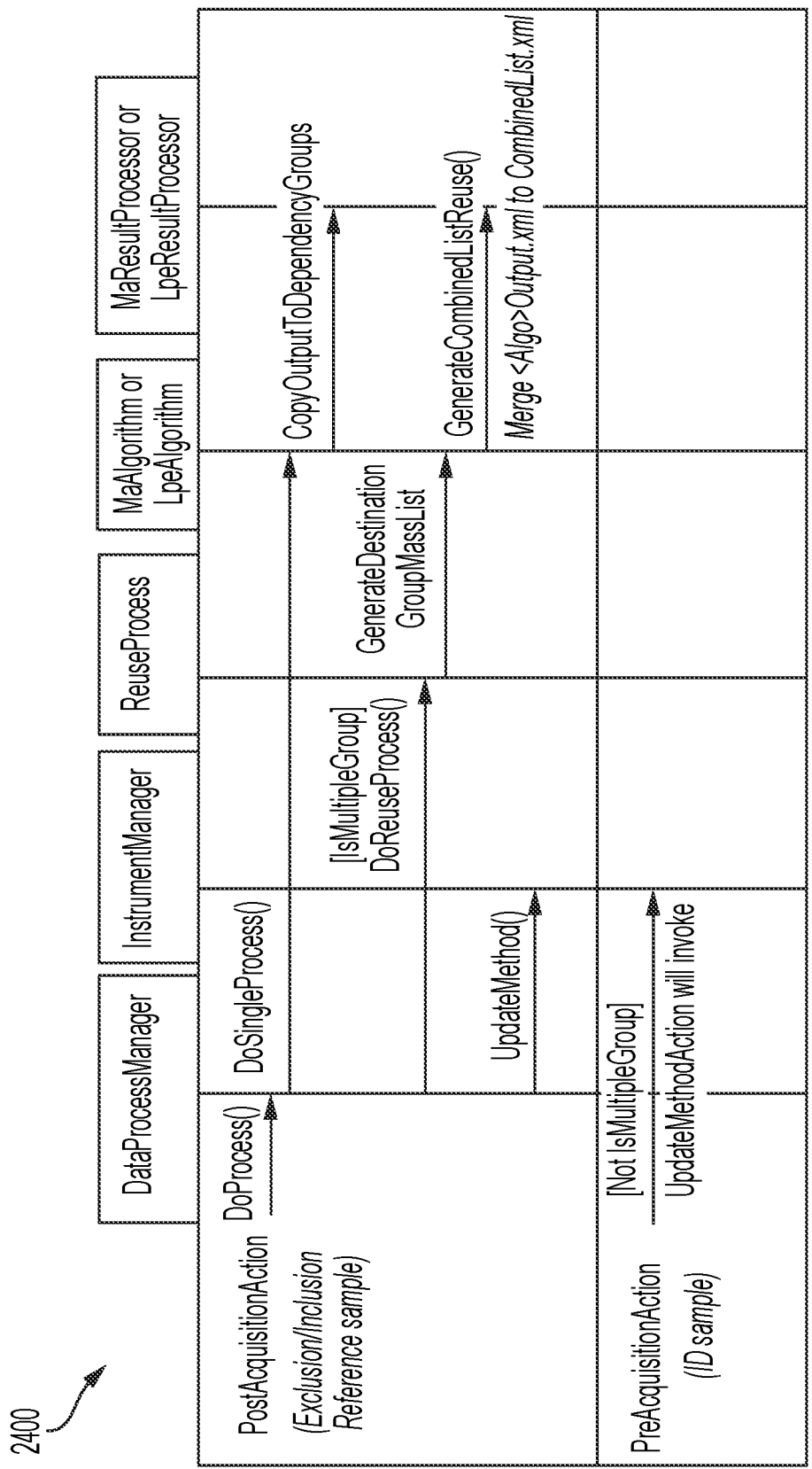
FIG. 24 is a flow diagram of an example post acquisition sequence process, in accordance with various embodiments.

FIG. 24 is a flow diagram of an example method 2400 of a post acquisition sequence process. At least one of the experiment manager logic 102, the data analysis logic 104, and the output logic 106 may perform the processes of the example method 2400. The post acquisition sequence may differ between an injection type sample ("ID sample") and an exclusion/inclusion reference sample. For example, given that the exclusion/inclusion list that is generated by the data analysis logic 104 may be reused, the method includes a reuse process for the exclusion/inclusion list after the exclusion/inclusion list is output.

Figure 25B:
FIG. 25B illustrates an injection type log for large molecules, in accordance with various embodiments.
Figure 25A:
FIG. 25A illustrates an injection type log for small molecules, in accordance with various embodiments.

FIG. 25A illustrates an injection type log 2500 for small molecules. The injection type log 2500 may be output to a storage device of a computing device by the output logic 106 after a small molecule experiment has been run. The injection type log 2500 may include a time stamp of the experiment and experiment details (e.g., the location of the experiment in the storage device of the computing device, a group number, exclusion/inclusion list parameters, etc.).

FIG. 25B illustrates an injection type log 2550 for large molecules. The injection type log 2550 may be output to a storage device of a computing device by the output logic 106 after a large molecule experiment has been run. The injection type log 2550 may include a time stamp of the experiment, experiment details (e.g., the location of the experiment in the storage device of the computing device, a group number, etc.), exclusion list parameters, and inclusion list parameters.

Figure 26:
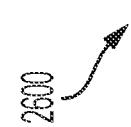
FIG. 26 illustrates an injection type naming convention, in accordance with various embodiments.

FIG. 26 illustrates an injection type naming convention 2600. The experiment manager logic 102 may display the injection type naming convention 2600 on a GUI, such as GUI 300 (FIG. 3). The experiment manager logic 102 names injection type samples based on at least one of the method template name, the experiment name, the time stamp, the group number, and the ID number.

Figure 27:
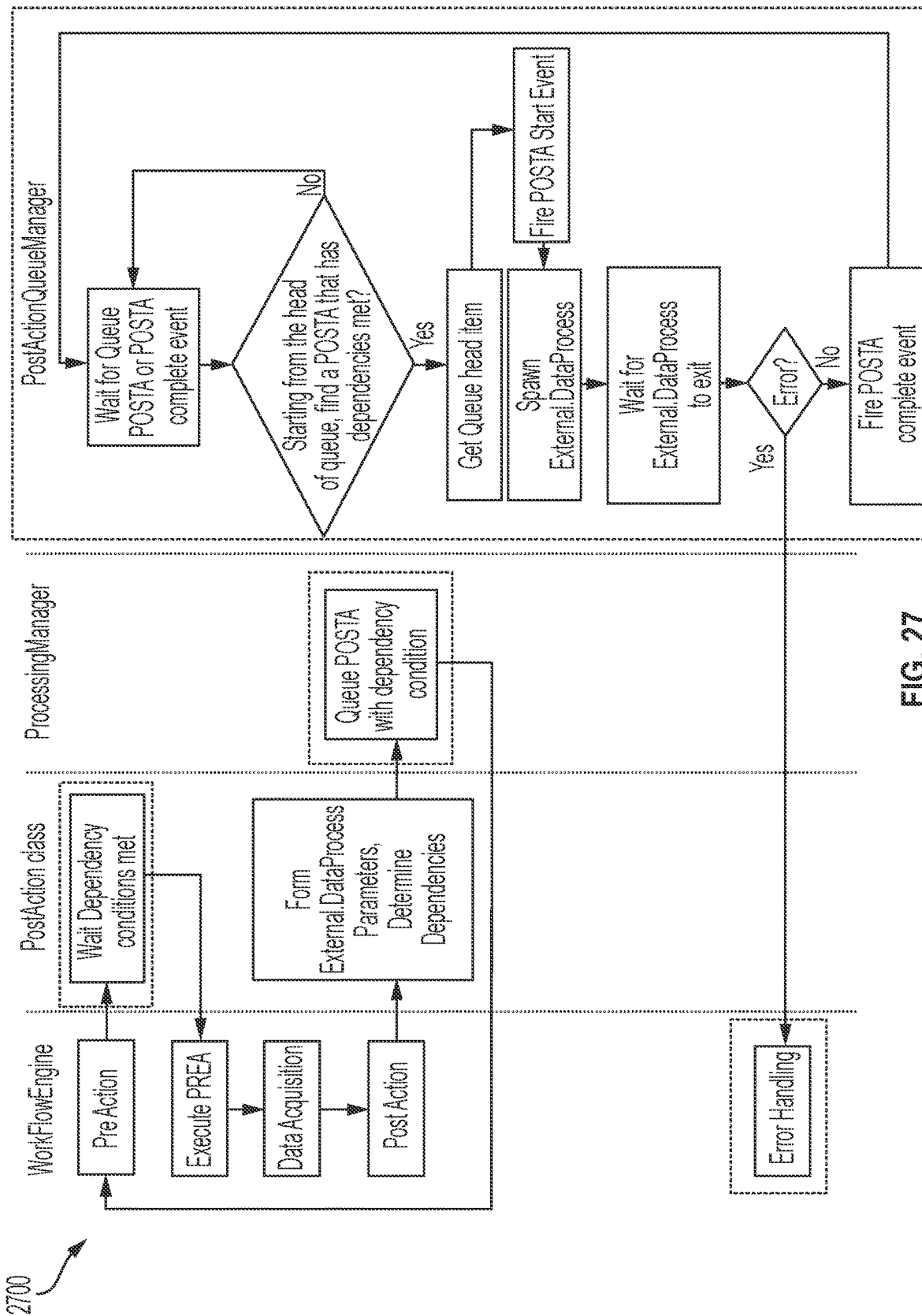
FIG. 27 is a flow diagram of an example method of parallel processing, in accordance with various embodiments.

FIG. 27 is a flow diagram of an example method of parallel processing 2700. The support module 100 may implement the method of parallel processing 2700. Acquisition continues for next sample while post-acquisition processing of exclusion or inclusion reference run is running if the next sample does not require the processing to finish, for example, it's not an ID run that requires the exclusion/inclusion list be generated for its method update prior to acquisition. Error handling auto deletes remaining samples in active sequence if a processing error occurred, and continues to start next sequence in the queue.

FIG. 28 illustrates a parallel processing workflow sequence table 2800. While executing the POSTA of a sample (Sample A), actions defined in the samples following Sample A are executed one at a time by the data analysis logic 104. Two ACQA are unable to be overlapped during parallel processing. When an experiment is requested to be stopped, active processing may be stopped and all queued POSTA may be cleared. When then experiment is then resumed, all samples with ACQA completed may have the POSTA queued. When an error occurs during PREA or POSTA, a "Continue on Error" interactive message will be displayed by the data analysis logic 104 on the GUI, such as GUI 300 (FIG. 3). When "Continue on Error" is selected after an experiment has begun, the error may be communicated to the data analysis logic 104 and all queued actions may be cleared. When "Continue on Error" is not selected after an experiment has begun, the action queue may be executed by the data analysis logic 104 until dependencies on the error are met. Failed samples may be able to be reinjected when "Continue on Error" is not selected. When a sequence is deleted, any active POSTA may be terminated an action queue may be cleared.

FIG. 29 illustrates a parallel processing power allocation table 2900. The power allocation of the computing device, such as computing device 400 (FIG. 4), is allocated based on the process(es) run by the data analysis logic 104. The power allocation is dependent on whether an ACQA has been done during the experiment or whether an ACQA has not been done during the experiment.

Figure 30:
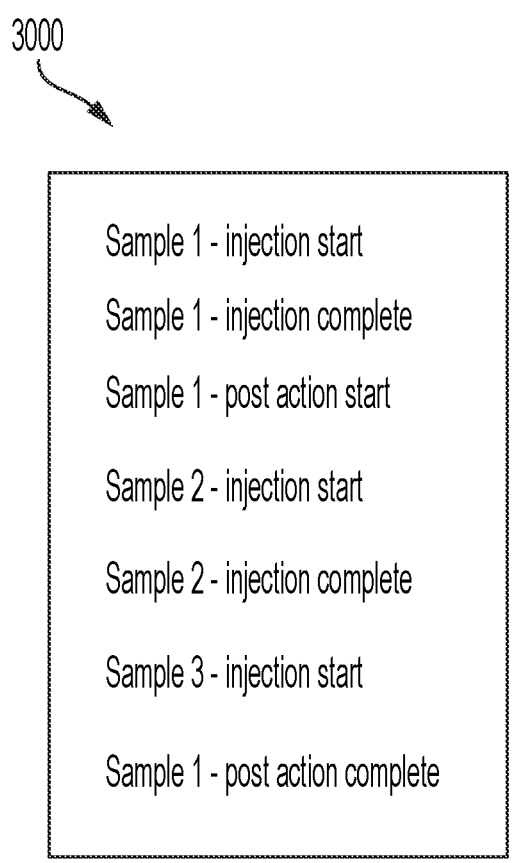
FIG. 30 illustrates an example event sequence segment for parallel processing, in accordance with various embodiments.

FIG. 30 illustrates an example event sequence segment 3000 for parallel processing. In some embodiments, events for a single sample may be a set order: pre-action start, pre-action complete, injection start, injection complete, post action start, and post-action complete. The events for multiple samples being processed using parallel processing may deviate from the set order. For example, the event sequence segment 3000 overlaps the steps for three different samples.

The following paragraphs provide various examples of the embodiments disclosed herein.

Example 1 is a method including receiving a first plurality of experiment parameters for a first experiment to be performed by a scientific instrument on a first sample, the first plurality of experiment parameters including a list that includes at least one selected from a group consisting of an inclusion list and an exclusions list, and storing the list. The method further includes receiving, with an electronic processor, a second plurality of experiment parameters for a second experiment to be performed by the scientific instrument, the second plurality of experiment parameters including a selection, within a graphical user interface, of the list from the first experiment to reuse for the second experiment. The method further includes receiving, with an electronic processor, experiment data relating to the second experiment and analyzing, with an electronic processor, the experiment data based on the list from the first experiment to determine a result of the second experiment.

Example 2 may include the subject matter of Example 1, and may further specify that the scientific instrument is a mass spectrometer.

Example 3 may include the subject matter of Example 1 or 2, and may further specify that the second plurality of experiment parameters for the second experiment include one or more list threshold values.

Example 4 may include the subject matter of Examples 1-3, and may further specify that the one or more list threshold values includes at least one selected from a group consisting of an exclusion override factor, an exclusion duration, an exclusive list peak window extension, an inclusion list peak window extension, and an inclusion list peak fragmentation threshold.

Example 5 may include the subject matter of Examples 1-4, and may further specify that the first sample and the second sample include a same raw data from the scientific instrument.

Example 6 may include the subject matter of Examples 1-5, and may further the second plurality of experiment parameters for the second experiment includes one or more list parameters, and wherein the one or more list parameters includes a selection to add isotopes detected in the first experiment to the exclusion list for the second experiment.

Example 7 may include the subject matter of Examples 1-6, and may further specify that the second plurality of experiment parameters for the second experiment includes one or more list parameters, and wherein the one or more list parameters includes one or more filtering parameters.

Example 8 may include the subject matter of Examples 1-7, and may further specify that analyzing the experiment data relating to the second experiment based on the list from the first experiment to determine a result of the second experiment includes analyzing the experiment data relating to the second experiment based on the list and the one or more list threshold values.

Example 9 may include the subject matter of Examples 1-8, and may further specify that receiving the second plurality of experiment parameters for the second experiment includes receiving a selection of the first list from the first experiment and a selection of a second list from a third experiment within the graphical user interface, and wherein analyzing the experiment data relating to the second experiment includes analyzing the experiment data relating to the first experiment based on a combined list generated based on the first list from the first experiment and the second list from the third experiment to determine the result of the second experiment.

Example 10 may include the subject matter of Examples 1-9, and may further specify that each of the first experiment and the second experiment include at least one selected from a group consisting of a deep scan experiment, an iterative precursor exclusion experiment, and a background exclusion experiment.

Example 11 may include one or more non-transitory computer readable media having instructions thereon that, when executed by one or more processing devices of the scientific instrument support, cause the scientific instrument support to perform the subject matter of Examples 1-10.

Example 12 may include a system for performing scientific instrument support. The system comprises an electronic computing device including an electronic processor. The electronic processor is configured to receive a selection of a first experiment type, the first experiment type indicating a first experiment to be performed by the scientific instrument on a first sample. The electronic processor is further configured to receive a first plurality of experiment parameters associated with the first experiment, the first plurality of experiment parameters including a list, the list including at least one selected from a group consisting of an inclusion list and an exclusion list, and store the list. The electronic processor is further configured to receive a second plurality of experiment parameters associated with a second experiment of the first experiment type to be performed by the scientific instrument on a second sample, the second plurality of experiment parameters including a selection, within a graphical user interface, of the at least one list from the first experiment to reuse for the second experiment, receive experiment data relating to the second experiment, and analyze the experiment data relating to the second experiment based on the list from the first experiment to determine a result of the second experiment.

Example 13 may include the subject matter of Example 12, and may further specify that the first experiment type is one of a large molecule experiment and a small molecule experiment.

Example 14 may include the subject matter of Example 12 or 13, and may further specify that the selection of the inclusion list for the second plurality of experiment parameters moves first data to the exclusion list.

Example 15 may include the subject matter of Examples 12-14, and may further specify that the result of the second experiment excludes the first data.

Example 16 may include the subject matter of Examples 12-15, and may further specify that the electronic processor is further configured to store the result of the second experiment and the second experiment parameters as a first group.

Example 17 may include the subject matter of Examples 12-16, and may further specify that the first group may be used as a third plurality of experiment parameters for a third experiment to be performed by the scientific instrument on a third sample.

Example 18 may include a scientific instrument support apparatus. The scientific instrument support apparatus includes a first logic. The first logic is configured to receive a first plurality of experiment parameters for a first experiment to be performed by a scientific instrument on a first sample, the first plurality of experiment parameters including a list, the list including at least one selected from a group consisting of an inclusion list and an exclusion list. The first logic is further configured to store the list as a second plurality of experiment parameters and receive an input within a graphical user interface for a second experiment to be performed by the scientific instrument on a second sample, the input including a selection, within the graphical user interface, of the second plurality of experiment parameters. The first logic is further configured to receive experiment data relating to the second experiment from an electronic processor of the scientific instrument and analyze the experiment data relating to the second experiment based on the list from the first experiment to determine a result of the second experiment.

Example 19 may include the subject matter of Example 18, and may further specify that the scientific instrument support apparatus includes a second logic. The second logic is configured to receive experiment data relating to the first experiment from the electronic processor of the scientific instrument and analyze the experiment data relating to the first experiment based on the experiment parameters received by the first logic to determine a result of the first experiment, wherein the result of the first experiment is the first plurality of experiment parameters.

Example 20 may include the subject matter of Example 19 or 20, and may further specify that the second logic receives a selection of a template based on a user interaction with the graphical user interface, wherein the experiment data relating to the first experiment is analyzed according to the template.

Example A includes any of the scientific instrument support modules disclosed herein.

Example B includes any of the methods disclosed herein.

Example C includes any of the GUIs disclosed herein.

Example D includes any of the scientific instrument support computing devices and systems disclosed herein.

The invention claimed is:

1. A method for providing scientific instrument support, comprising:
   receiving a first plurality of experiment parameters for a first experiment to be performed by a scientific instrument on a first sample, the first plurality of experiment parameters including a list, the list including at least one selected from a group consisting of an inclusion list and an exclusion list;
   storing the list;
   receiving, with an electronic processor, a second plurality of experiment parameters for a second experiment to be performed by the scientific instrument on a second sample, the second plurality of experiment parameters including a selection, within a graphical user interface, of the list from the first experiment to reuse for the second experiment;
   receiving, with the electronic processor from the scientific instrument, experiment data relating to the second experiment; and
   analyzing, with the electronic processor, the experiment data relating to the second experiment based on the list from the first experiment to determine a result of the second experiment.

2. The method of claim 1, wherein the scientific instrument is a mass spectrometer.

3. The method of claim 1, wherein the second plurality of experiment parameters for the second experiment include one or more list threshold values.

4. The method of claim 3, wherein the one or more list threshold values includes at least one selected from a group consisting of an exclusion override factor, an exclusion duration, an exclusive list peak window extension, an inclusion list peak window extension, and an inclusion list peak fragmentation threshold.

5. The method of claim 1, wherein the first sample and the second sample include a same raw data from the scientific instrument.

6. The method of claim 1, wherein the second plurality of experiment parameters for the second experiment includes one or more list parameters, and wherein the one or more list parameters includes a selection to add isotopes detected in the first experiment to the exclusion list for the second experiment.

7. The method of claim 1, wherein the second plurality of experiment parameters for the second experiment includes one or more list parameters, and wherein the one or more list parameters includes one or more filtering parameters.

8. The method of claim 1, wherein analyzing the experiment data relating to the second experiment based on the list from the first experiment to determine the result of the second experiment includes analyzing the experiment data relating to the second experiment based on the list and one or more list threshold values.

9. The method of claim 1, wherein receiving the second plurality of experiment parameters for the second experiment includes receiving a selection of the list from the first experiment and a selection of a second list from a third experiment within the graphical user interface, and wherein analyzing the experiment data relating to the second experiment includes analyzing the experiment data relating to the first experiment based on a combined list generated based on the list from the first experiment and the second list from the third experiment to determine the result of the second experiment.

10. The method of claim 1, wherein each of the first experiment and the second experiment include at least one selected from a group consisting of a deep scan experiment, an iterative precursor exclusion experiment, and a background exclusion experiment.

11. One or more non-transitory computer readable media having instructions thereon that, when executed by one or more processing devices of a scientific instrument support, cause the scientific instrument support to perform the method of claim 1.

12. A system for performing scientific instrument support, the system comprising:
an electronic computing device including an electronic processor, the electronic processor configured to:
receive a selection of a first experiment type, the first experiment type indicating a first experiment to be performed by the scientific instrument on a first sample,
receive a first plurality of experiment parameters associated with the first experiment, the first plurality of experiment parameters including a list, the list including at least one selected from a group consisting of an inclusion list and an exclusion list,
store the list,
receive a second plurality of experiment parameters associated with a second experiment of the first experiment type to be performed by the scientific instrument on a second sample, the second plurality of experiment parameters including a selection, within a graphical user interface, of the at least one list from the first experiment to reuse for the second experiment,
receive experiment data relating to the second experiment, and
analyze the experiment data relating to the second experiment based on the list from the first experiment to determine a result of the second experiment.

13. The system of claim 12, wherein the first experiment type is one of a large molecule experiment and a small molecule experiment.

14. The system of claim 12, wherein the selection of the inclusion list for the second plurality of experiment parameters moves first data to the exclusion list.

15. The system of claim 14, wherein the result of the second experiment excludes the first data.

16. The system of claim 12, wherein the electronic processor is further configured to store the result of the second experiment and the second experiment parameters as a first group.

17. The system of claim 16, wherein the first group may be used as a third plurality of experiment parameters for a third experiment to be performed by the scientific instrument on a third sample.

18. A scientific instrument support apparatus, comprising:
a data analysis logic configured to:
receive a first plurality of experiment parameters for a first experiment to be performed by a scientific instrument on a first sample, the first plurality of experiment parameters including a list, the list including at least one selected from a group consisting of an inclusion list and an exclusion list,
store the list as a second plurality of experiment parameters,
receive an input within a graphical user interface for a second experiment to be performed by the scientific instrument on a second sample, the input including a selection, within the graphical user interface, of the second plurality of experiment parameters,
receive experiment data relating to the second experiment from an electronic processor of the scientific instrument, and
analyze the experiment data relating to the second experiment based on the second plurality of experiment parameters to determine a result of the second experiment.

19. The scientific instrument support apparatus of claim 18, wherein the data analysis logic is further configured to receive experiment data relating to the first experiment and analyze the experiment data relating to the first experiment based on the experiment parameters determine a result of the first experiment, wherein the result of the first experiment is the first plurality of experiment parameters.

20. The scientific instrument support apparatus of claim 19 further comprising an experiment manager logic that receives a selection of a template, wherein the experiment data relating to the first experiment is analyzed according to the template.

* * * * *